(12) United States Patent
Pinto et al.

(10) Patent No.: US 12,393,432 B2
(45) Date of Patent: Aug. 19, 2025

(54) MECHANISM TO DISCOVER COMPUTATIONAL STORAGE FUNCTIONS AND DEVICES

(71) Applicant: Samsung Electronics Co., Ltd., Suwon-si (KR)

(72) Inventors: Oscar P. Pinto, San Jose, CA (US); Vishwanath Maram, San Jose, CA (US); Hingkwan Huen, San Jose, CA (US); Danqing Jin, San Jose, CA (US); William Martin, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/234,780

(22) Filed: Apr. 19, 2021

(65) Prior Publication Data
US 2022/0066799 A1 Mar. 3, 2022

Related U.S. Application Data

(60) Provisional application No. 63/144,469, filed on Feb. 1, 2021, provisional application No. 63/073,922, filed on Sep. 2, 2020.

(51) Int. Cl.
*G06F 3/06* (2006.01)
*G06F 9/38* (2018.01)
(Continued)

(52) U.S. Cl.
CPC ............ *G06F 9/452* (2018.02); *G06F 3/0607* (2013.01); *G06F 3/0631* (2013.01);
(Continued)

(58) Field of Classification Search
CPC .. G06F 16/1734; G06F 3/0607; G06F 3/0631; G06F 3/0653; G06F 3/067; G06F 9/3877; G06F 9/452; G06F 9/5027
See application file for complete search history.

(56) References Cited

U.S. PATENT DOCUMENTS 5,805,777 A 9/1998 Kuchta
6,976,255 B1 12/2005 Clark et al.
(Continued)

FOREIGN PATENT DOCUMENTS

CN 102929813 B 6/2016
CN 109254873 A 1/2019
(Continued)

OTHER PUBLICATIONS

Anandan, Sabby et al., "Industry Paper: Spring XD—A Modular Distributed Stream and Batch Processing System," DEBS '15: Proceedings of the 9th ACM International Conference on Distributed Event-Based Systems, Jun. 2015, pp. 217-225.
(Continued)

*Primary Examiner* — Yong J Choe
(74) *Attorney, Agent, or Firm* — Renaissance IP Law Group LLP

(57) ABSTRACT

A device is described. The device may include a connector to connect the device to a component. The device may also include a computational storage unit. A receiver may receive a discovery request from a discovery service, and a transmitter may transmit a discovery response to the discovery service, the discovery response including information about the computational storage unit.

17 Claims, 17 Drawing Sheets

(51) Int. Cl.
  *G06F 9/451* (2018.01)
  *G06F 16/17* (2019.01)
(52) U.S. Cl.
  CPC ............ *G06F 3/0653* (2013.01); *G06F 3/067* (2013.01); *G06F 9/3877* (2013.01); *G06F 16/1734* (2019.01)

(56) References Cited

U.S. PATENT DOCUMENTS

| | | | |
|---|---|---|---|
| 7,315,807 | B1 | 1/2008 | Lavallee et al. |
| 7,433,931 | B2 | 10/2008 | Richoux |
| 7,801,931 | B2 | 9/2010 | Tunar et al. |
| 7,937,703 | B2 | 5/2011 | Bethea et al. |
| 8,381,004 | B2 | 2/2013 | Elnozahy et al. |
| 8,615,570 | B2 | 12/2013 | Brewis et al. |
| 8,726,299 | B1 | 5/2014 | Bromley et al. |
| 8,904,072 | B2 | 12/2014 | Lee |
| 8,943,504 | B2 | 1/2015 | Vijayarajan et al. |
| 9,203,627 | B2 | 12/2015 | Edstrom et al. |
| 9,398,016 | B1 | 7/2016 | Chakraborty et al. |
| 9,406,082 | B2 | 8/2016 | Smedberg et al. |
| 9,596,135 | B1 | 3/2017 | Thomas et al. |
| 9,626,120 | B1 | 4/2017 | Jia et al. |
| 10,162,793 | B1 | 12/2018 | Bshara et al. |
| 10,303,382 | B1 | 5/2019 | Chu et al. |
| 10,359,953 | B2 | 7/2019 | Cargnini et al. |
| 10,394,746 | B2 | 8/2019 | Kachare et al. |
| 10,404,811 | B2 | 9/2019 | Ly et al. |
| 10,412,187 | B2 | 9/2019 | Busayarat et al. |
| 10,476,936 | B1 | 11/2019 | Retnakumari et al. |
| 10,521,114 | B2 | 12/2019 | Thomas |
| 10,621,114 | B1 | 4/2020 | Bshara et al. |
| 10,637,962 | B2 | 4/2020 | Gay et al. |
| 10,771,340 | B2 | 9/2020 | Ballapuram |
| 10,795,726 | B2 | 10/2020 | Fujii et al. |
| 10,802,753 | B2 | 10/2020 | Kabra et al. |
| 10,838,905 | B2 | 11/2020 | Zou et al. |
| 10,846,096 | B1 | 11/2020 | Chung et al. |
| 10,860,511 | B1 | 12/2020 | Thompson et al. |
| 10,877,750 | B1 | 12/2020 | Connolly et al. |
| 11,294,576 | B2 | 4/2022 | Khan et al. |
| 11,334,382 | B2 | 5/2022 | Bernat et al. |
| 11,474,974 | B2 | 10/2022 | Lutz et al. |
| 11,507,298 | B2 | 11/2022 | Yang et al. |
| 11,630,921 | B2 | 4/2023 | Sinha et al. |
| 11,687,498 | B2 | 6/2023 | Trika et al. |
| 2003/0093572 | A1 | 5/2003 | Laux et al. |
| 2004/0220918 | A1 | 11/2004 | Scriffignano et al. |
| 2005/0132341 | A1 | 6/2005 | Lanzatella et al. |
| 2007/0276924 | A1 | 11/2007 | Newton et al. |
| 2008/0004887 | A1 | 1/2008 | Brunswig et al. |
| 2008/0279161 | A1 | 11/2008 | Stirbu et al. |
| 2011/0066676 | A1 | 3/2011 | Kleyzit et al. |
| 2011/0185295 | A1 | 7/2011 | Kashida |
| 2012/0079172 | A1 | 3/2012 | Yoshida |
| 2012/0152576 | A1 | 6/2012 | Bassinger et al. |
| 2012/0162234 | A1 | 6/2012 | Blinzer et al. |
| 2013/0173662 | A1 | 7/2013 | Kaplinger et al. |
| 2014/0143778 | A1 | 5/2014 | Gopal et al. |
| 2014/0310332 | A1 | 10/2014 | Huang et al. |
| 2015/0319246 | A1 | 11/2015 | Ishizaka |
| 2016/0012128 | A1 | 1/2016 | Siebler et al. |
| 2016/0054931 | A1 | 2/2016 | Romanovsky et al. |
| 2016/0328344 | A1 | 11/2016 | Jose et al. |
| 2017/0249088 | A1 | 8/2017 | Thomas |
| 2018/0063145 | A1 | 3/2018 | Cayton et al. |
| 2018/0352038 | A1 | 12/2018 | Sathyanarayana et al. |
| 2019/0037280 | A1* | 1/2019 | Yang ................ H04N 21/63345 |
| 2019/0349281 | A1 | 11/2019 | Oztaskent et al. |
| 2020/0012439 | A1 | 1/2020 | Khan et al. |
| 2020/0050480 | A1 | 2/2020 | Cao et al. |
| 2020/0057578 | A1 | 2/2020 | Benisty et al. |
| 2020/0081640 | A1 | 3/2020 | Enz et al. |
| 2020/0117517 | A1* | 4/2020 | Costa ..................... G06F 3/067 |
| 2020/0167098 | A1 | 5/2020 | Shah et al. |
| 2020/0183582 | A1 | 6/2020 | Kachare et al. |
| 2020/0192592 | A1 | 6/2020 | Song et al. |
| 2020/0201575 | A1 | 6/2020 | Mizrahi |
| 2020/0301898 | A1 | 9/2020 | Samynathan et al. |
| 2020/0310694 | A1 | 10/2020 | Gao et al. |
| 2020/0379781 | A1 | 12/2020 | Rachapudi et al. |
| 2021/0026560 | A1 | 1/2021 | Pillai et al. |
| 2021/0247922 | A1 | 8/2021 | Song et al. |
| 2021/0303159 | A1 | 9/2021 | Ke |
| 2021/0377117 | A1 | 12/2021 | Kanevsky et al. |
| 2022/0058137 | A1 | 2/2022 | Xu et al. |
| 2022/0188028 | A1 | 6/2022 | Mesnier et al. |
| 2022/0236911 | A1* | 7/2022 | Jones ..................... G06F 3/0679 |
| 2022/0295255 | A1* | 9/2022 | Karampatsis ......... H04W 8/005 |
| 2023/0244499 | A1 | 8/2023 | Gupta et al. |

FOREIGN PATENT DOCUMENTS

| | | |
|---|---|---|
| EP | 3964956 A1 | 3/2022 |
| KR | 20120071060 A | 7/2012 |
| KR | 20140001970 A1 | 1/2014 |
| KR | 20170121661 A | 11/2017 |
| KR | 20180106822 A | 10/2018 |
| KR | 20200068564 A | 6/2020 |
| TW | 200622673 A | 7/2006 |
| TW | 201214288 A | 4/2012 |
| TW | 202102976 A | 1/2021 |
| WO | 2002097610 A1 | 12/2002 |

OTHER PUBLICATIONS

Carbone, Paris et al., "Apache Flink™: Stream and Batch Processing in a Single Engine," Bulletin of the IEEE Computer Society Technical Committee on Data Engineering, vol. 36, No. 4, 2015, pp. 28-38.

European Extended Search Report for Application No. 21190626.8, mailed Jan. 28, 2022.

European Extended Search Report for Application No. 21212137.0, mailed Apr. 28, 2022.

Fisher, Mark et al., "Spring XD Guide", 1.3.3.Build-Snapshot, 2013, 400 pages.

NVM Express, Inc., "Nvm Express TM over Fabrics Revision 1.1," Oct. 22, 2019, pp. 1-83, XP055877791, Retrieved from the Internet: URL:https://nvmexpress.org/wp-content/uploads/NVMe-over-Fabrics-1.1-2019.10.22-Ratified.pdf, retrieved on Jan. 11, 2022.

Office Action for U.S. Appl. No. 17/495,810, mailed Oct. 17, 2022.

Torabzadehkashi, Mahdi, et al. "Computational Storage: An Efficient and Scalable Platform for Big Data and HPC Applications," Journal of Big Data, vol. 6, No. 1, 2019, pp. 1-29.

Final Office Action for U.S. Appl. No. 17/495,810, mailed Apr. 14, 2023.

Office Action for U.S. Appl. No. 17/359,495, mailed Dec. 7, 2023.

Office Action for U.S. Appl. No. 17/495,810, mailed Oct. 5, 2023.

Office Action for U.S. Appl. No. 17/502,023, mailed Oct. 5, 2023.

Bates, Stephen, "Accelerating RocksDB with Eideticom's NoLoad NVMe-based Computational Storage Processor," Storage Developer Conference 2019, Sep. 2019, retrieved from the Internet: URL:https://www.snia.org/sites/defaultifiles/SDC/2019/presentations/Computational/Bates_Stephen_Accelerating_RocksDB_with_Eideticom's_NoLoad_NVMe-based_ComputationalStorage_Processor.pdf [retrieved on Feb. 8, 2024], 16 pages.

Chambers, Bill et al., "Spark, The Definitive Guide: Big Data Processing Made Simple", first 400 pages, Feb. 2018, retrieved from the Internet: URL:https://analyticsdata24.files.wordpress.com/2020/02/spark-the-definitive-guide40www.bigdatabugs.com_.pdf [retrieved on Jan. 18, 2024], 400 pages.

European Summons to Oral Proceedings for Application No. 21190626.8, mailed Feb. 15, 2024.

European Summons to Oral Proceedings for Application No. 21190952.8, mailed Jan. 25, 2024.

Gounaris, Anastasios et al., "Dynamic Configuration of Partitioning in Spark Applications," IEEE Transactions on Parallel and Distributed Systems, vol. 28, No. 7, Jul. 2017, [retrieved on Jun. 10, 2017], pp. 1891-1904.

(56) References Cited

OTHER PUBLICATIONS

Molgaard, Jason, "A Simple Approach to Implementing Computational Storage," Storage Developer Conference 2019, Sep. 2019, retrieved from the Internet: URL:https://www.snia.org/sites/defaultifiles/SDC/2019/presentations/Computational/Molgaard_Jason_A_Simple_Approach_to_Implementing_Computational_Storage.pdf [retrieved on Feb. 8, 2024], 25 pages.
Prasaad, Guna et al., "Improving High Contention OLTP Performance via Transaction Scheduling", arXiv.org, Oct. 2018, retrieved from the Internet: URL:https://arxiv.org/pdf/1810.01997.pdf [retrieved on Jan. 17, 2024], 15 pages.
Sabiu, Habib Ado, "Performance Evaluation of Job Scheduling and Resource Allocation in Apache Spark," Jul. 2018, retrieved from the Internet: URL:https://harvest.usask.ca/server/api/core/bitstreams/9654d97a-5217-486d-b8ae-df305acfc5b8/content [retrieved on Jan. 17, 2024], 104 pages.
Shadley, Scott et al., "What Happens When Compute Meets Storage?," Sep. 2019, retrieved from the Internet: URL:https://www.snia.org/sites/defaultifiles/SDC/2019/presentations/Computational/Shadley_Scott_Adams_Nick_What_Happens_when_Compute_meets_Storage_Computational_Storage_TWG.pdf [retrieved on Jan. 13, 2022], 28 pages.
Sniavideo: "What Happens when Compute Meets Storage (SDC 2019)," Oct. 2019, retrieved from the Internet: URL:https://www.youtube.com/watch?=45nhck3tN4U [retrieved on Feb. 8, 2024], 2 pages.
Tang, Shanjiang et al., "A Survey on Spark Ecosystem for Big Data Processing," arxiv.org, Nov. 2018, 21 pages.
Wikipedia, "Message Broker," Jul. 2020, retrieved from the Internet: URL:https://en.wikipedia.org/w/index.php?title=Message_broker&0ldid=966520924 [retrieved on Jan. 18, 2024], 3 pages.
Castellani, Angelo p et al., "WebIoT: A Web Application Framework for the Internet of Things," WCNC 2012 Workshop on Internet of Things Enabling Technologies, Embracing Machine-to-Machine Communications and Beyond, 2012, pp. 202-207.
European Office Action for Application No. 22174076.4, mailed Jul. 8, 2024.
Kerdoudi, Mohamed Lamine et al., "Recovering Software Architecture Product Lines," 2019 24th International Conference on Engineering of Complex Computer Systems (ICECCS), 2019, pp. 226-235.
European Office Action for Application No. 21190952.8, mailed Oct. 18, 2024.
European Office Action for Application No. 21212137.0, mailed Oct. 25, 2024.
Li, Yonghui et al., "Architecture and Analysis of a Dynamically-Scheduled Real-Time Memory Controller," Real-Time Systems, Jul. 2015, vol. 52, pp. 675-729.
Li, Yonghui, "Design and Formal Analysis of Real-Time Memory Controllers," Phd Thesis 1 (Research TU/e / Graduation TU/e), Electrical Engineering, Sep. 2016, 207 pages.
Mutlu, Onur et al., "Parallelism—Aware Batch Scheduling: Enhancing both Performance and Fairness of Shared DRAM Systems," International Symposium on Computer Architecture, ACM SIGARCH Computer Architecture News, 2008, vol. 36, Issue 3, pp. 63-74.
Prieto, Pablo et al., "CMP Off-Chip Bandwidth Scheduling Guided by Instruction Criticality," ICS '13: Proceedings of the 27th International ACM Conference on International Conference on Supercomputing, Jun. 2013, pp. 379-388.
Zhou, Ping et al., "Throughput Enhancement for Phase Change Memories," IEEE Transactions on Computers, vol. 63, No. 8, Aug. 2014, pp. 2080-2093.
Final Office Action for U.S. Appl. No. 17/502,023, mailed Jun. 20, 2024.
Notice of Allowance for U.S. Appl. No. 17/495,810, mailed Aug. 22, 2024.
Office Action for U.S. Appl. No. 17/359,495, mailed Aug. 12, 2024.
Final Office Action for U.S. Appl. No. 17/495,810, mailed May 20, 2024.
Corrected Notice of Allowability for U.S. Appl. No. 17/495,810, mailed Dec. 11, 2024.
Corrected Notice of Allowability for U.S. Appl. No. 17/495,810, mailed Oct. 25, 2024.
Corrected Notice of Allowability for U.S. Appl. No. 17/495,810, mailed Oct. 7, 2024.
Notice of Allowance for U.S. Appl. No. 17/502,023, mailed Nov. 26, 2024.
Warke, Amit, et al. "Storage Service Orchestration with Container Elasticity," 2018 IEEE 4th International Conference on Collaboration and Internet Computing (CIC), IEEE, 2018, pp. 283-292.
Notice of Allowability for U.S. Appl. No. 17/502,023, mailed Feb. 4, 2025.
Notice of Allowance for U.S. Appl. No. 17/359,495, mailed Mar. 10, 2025.
European Summons to Oral Proceedings for Application No. 21190952.8, mailed Mar. 26, 2025.
Corrected Notice of Allowability for U.S. Appl. No. 17/502,023, mailed Jun. 30, 2025.

* cited by examiner

| Discovery Service | | | | | |
|---|---|---|---|---|---|
| Host ID | Device ID | CS Cap | CS Type | Supp. | Pair ID |
| 192.168.1.2 | 0x0001 | 0x08 | 0x00 | ... | 0x0002 |

MECHANISM TO DISCOVER COMPUTATIONAL STORAGE FUNCTIONS AND DEVICES

RELATED APPLICATION DATA

This application claims the benefit of U.S. Provisional Patent Application Ser. No. 63/073,922, filed Sep. 2, 2020, and U.S. Provisional Patent Application Ser. No. 63/144,469, filed Feb. 1, 2021, both of which are incorporated by reference herein for all purposes.

FIELD

The disclosure relates generally to storage devices, and more particularly to discovery and use of computational storage devices.

BACKGROUND

Storage device capacities continue to increase, with the size of data stored on such storage devices increasing in parallel. Processing of that data-searching it, performing queries, and the like-en masse may require moving significant amounts of data from storage to memory for the processor to then process the data.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
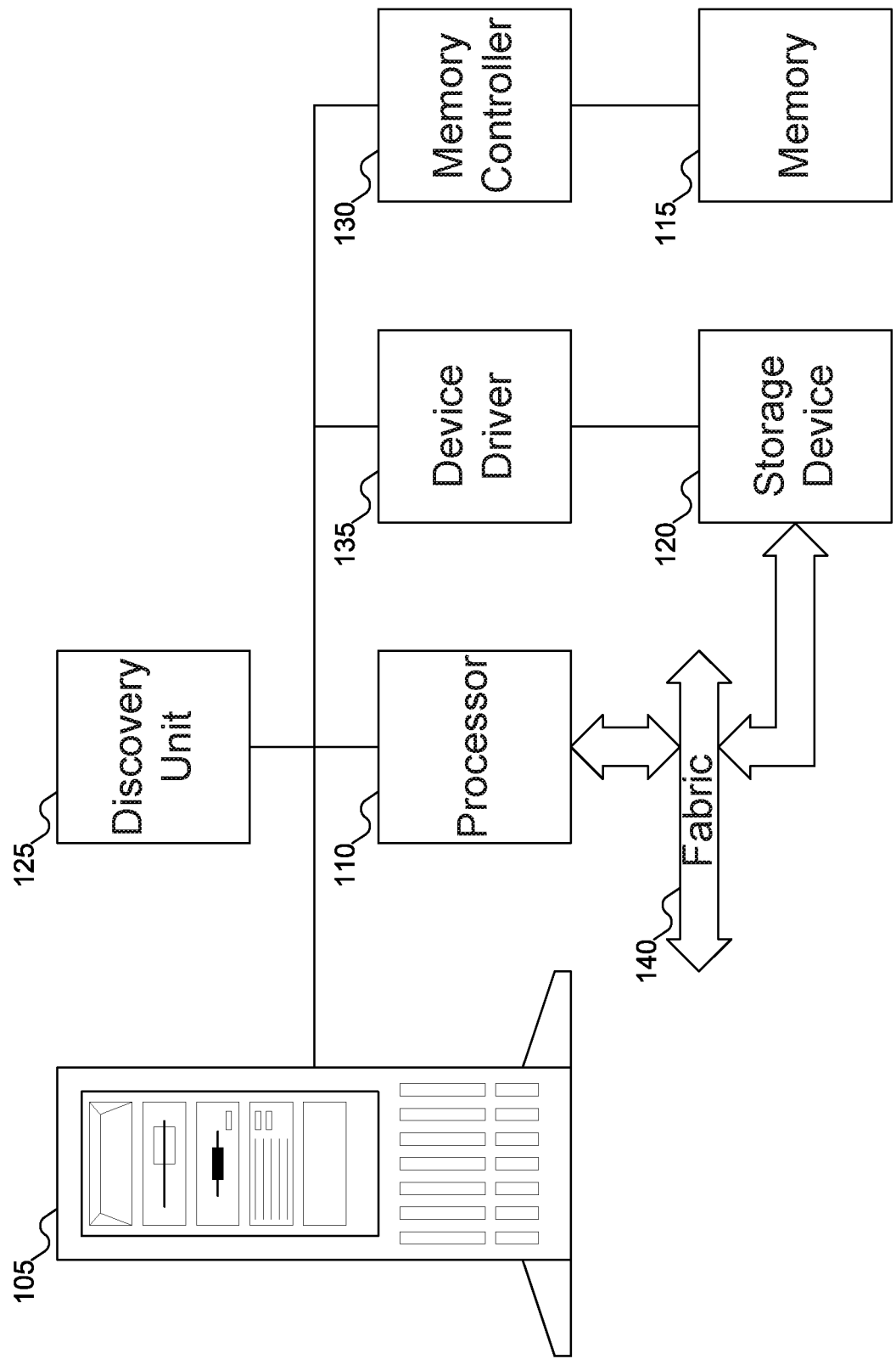
FIG. 1 shows a system including a storage device associated with a computational storage unit that may be discovered, according to embodiments of the disclosure.

Embodiments of the disclosure include a storage device that may be associated with a computational storage unit. Upon discovery, the storage device or the computational storage unit may return information about the computational storage unit. This information may then permit an application to locate and use the computational storage unit.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

When comparing the time required to move the data from storage to memory with the time required to process the data, the former might be longer than the latter. In other words, the computer may spend more time bringing the data closer to the processor than to actually process the data. The larger the amount of data to be moved, the greater this difference may become. The problem may be exacerbated if the results of the processing are to be moved back to storage: in such a situation the data is moved twice (once from storage to memory, and once from memory back to storage), which may double the time spent moving data to and from storage.

A need remains for a mechanism for discovery and use of computational storage resources.

In embodiments of the disclosure, storage devices may include processing that is closer to the storage. For example, a storage device might include an in-storage processor, or a nearby accelerator. Because such resources may be located closer to the data, it may be possible to reduce (and/or potentially eliminate) the need to move data between storage and memory. By reducing or eliminating the time spent moving data between storage and memory, processing data closer to storage may result in faster overall processing of the data. In addition, since the processing may be performed closer to the storage, the host processor may be freed to execute other commands.

But to be able to use such resources, applications need to be able to determine that such resources are available. If an application is not able to determine that a particular resource is available, the application might not use the resource. As a result, the application may send processing commands to the processor rather than a resource that might perform the command more quickly and/or more efficiently.

Thus, embodiments of the disclosure may include a system and method for discovery of such resources, which may be termed computational storage units. Once computational storage units are discovered, applications may receive notification of their existence, either through a discovery process being initiated by the application or through a discovery service that may identify the available computational storage units. An application programming interface (API) may be used to permit the application to use the computational resource without having to determine the specific interface and/or protocol used by the computational storage unit, with the implementation of the API hiding these specifics from the application.

FIG. 1 shows a system including a storage device associated with a computational storage unit that may be discovered, according to embodiments of the disclosure. To enable discovery of a storage device associated with a computational storage unit, machine 105 may include processor 110, memory 115, storage device 120, and discovery unit 125. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multicore processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 130. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 135. Storage device 120 may be associated with a computational storage unit. As discussed below with reference to FIGS. 3A-3D, the computational storage unit may be part of storage device 120 or it may be separate from storage device 120. The phrase "associated with" is intended to cover both a storage device that includes a computational storage unit and a storage device that is paired with a computational storage unit that is not part of the storage device itself. In other words, a storage device and a computational storage unit may be said to be "paired" when they are physically separate devices but are connected in a manner that enables them to communicate with each other.

In addition, the connection between the storage device and the paired computational storage unit might enable the two devices to communicate, but might not enable one (or both) devices to work with a different partner: that is, the storage device might not be able to communicate with another computational storage unit, and/or the computational storage unit might not be able to communicate with another storage device. For example, the storage device and the paired computational storage unit might be connected serially (in either order) to the fabric, enabling the computational storage unit to access information from the storage device in a manner another computational storage unit might not be able to achieve.

While FIG. 1 uses the generic term "storage device", embodiments of the disclosure may include any storage device formats that may be associated with computational storage, examples of which may include hard disk drives and Solid State Drives (SSDs). Any reference to "SSD" below should be understood to include such other embodiments of the disclosure.

Discovery unit 125 may be any unit that may assist in the discovery of components within machine 105. Discovery unit 125 may be a component that may send out queries along connections within machine 105 to determine what components are included within machine 105. Discovery unit 125 may, for example, determine that storage device 120 is located in machine 105, and more particularly may discover that storage device 120 is associated with a computational storage unit and learn information about the computational storage unit. Example implementations of discovery unit 125 may include a circuit built into processor 110, a management controller (such as a Baseboard Management Controller), and the like. Discovery unit 125 may also be implemented as software running on processor 110. While FIG. 1 shows machine 105 including only one discovery unit 125, machine 105 may include two or more discovery units 125. In addition, while FIG. 1 shows machine 105 as including discovery unit 125, discovery unit 125 may be located in a machine that is remote from machine 105 across a network.

Processor 105 and storage device 120 are shown as connecting to fabric 140. Fabric 140 is intended to represent any fabric along which information may be passed. Fabric 140 may include fabrics that may be internal to machine 105, and which may use interfaces such as Peripheral Component Interconnect Express (PCIe), Serial AT Attachment (SATA), Small Computer Systems Interface (SCSI), among others. Fabric 140 may also include fabrics that may be external to machine 105, and which may use interfaces such as Ethernet, Infiniband, or Fibre Channel, among others. In addition, fabric 140 may support one or more protocols, such as Non-Volatile Memory Express (NVMe), NVMe over Fabrics (NVMe-oF), or Simple Service Discovery Protocol (SSDP), among others. Thus, fabric 140 may be thought of as encompassing both internal and external networking connections, over which commands may be sent, either directly or indirectly, to storage device 120 (and more particularly, the computational storage unit associated with storage device 120).

FIG. 1 shows both processor 105 and storage device 120 as being connected to fabric 140 because processor 105 and storage device 120 may communicate via a fabric. In some embodiments of the disclosure, storage device 120 may include a connection to fabric 120 that may include the ability to communicate with a remote machine and/or a network: for example, a network-capable Solid State Drive (SSD). But in other embodiments of the disclosure, while machine 105 may include a connection to another machine and/or a network (which connection may be considered part of fabric 140), storage device 120 might not be connected to another machine and/or network. In such embodiments of the disclosure, storage device 120 and its associated computational storage unit may still be reachable from a remote machine, but such commands may pass through processor 110 or discovery unit 125, among other possibilities, to reach storage device 120.

While the discussion above (and below) focuses on storage device 120 as being associated with a computational storage unit, embodiments of the disclosure may extend to devices other than storage devices that may include or be associated with a computational storage unit. Any reference to "storage device" above (and below) may be understood as also encompassing other devices that might be associated with a computational storage unit.

Figure 2:
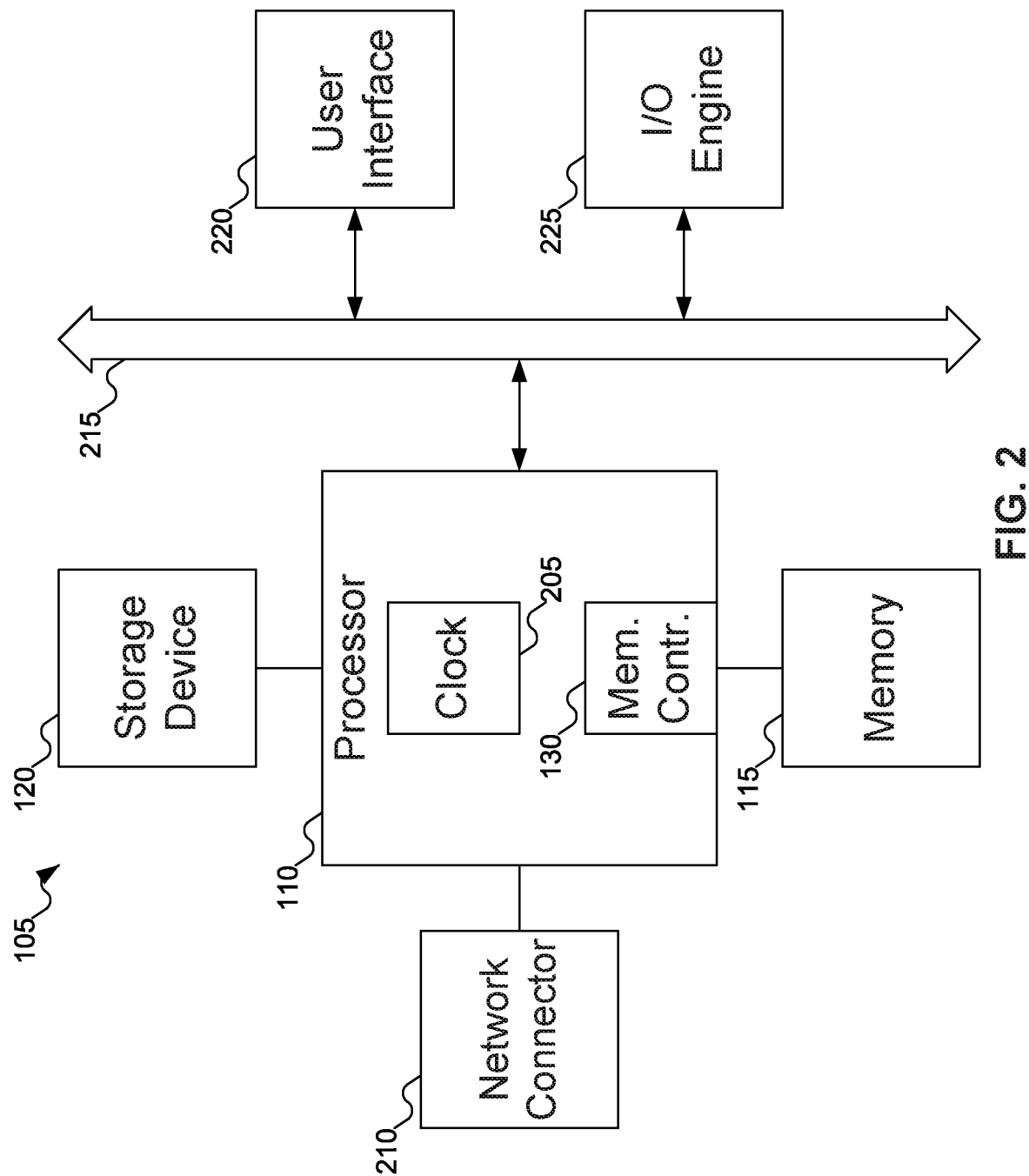
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 130 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
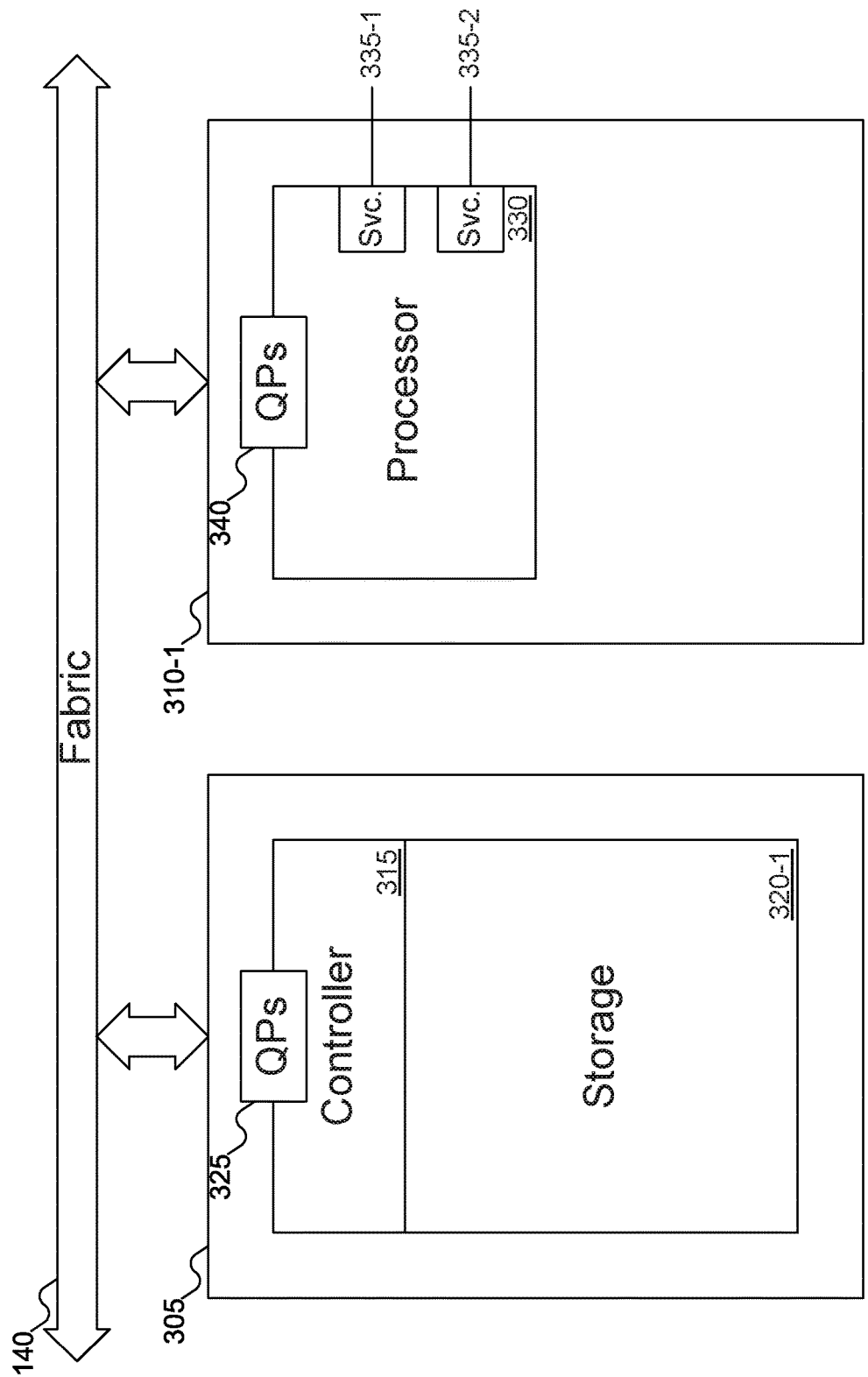
FIG. 3A shows a first example arrangement of a computational storage unit that may be associated with the storage device of FIG. 1, according to embodiments of the disclosure.

FIGS. 3A-3D show various arrangements of the computational storage unit that may be associated with storage device 120 of FIG. 1, according to embodiments of the disclosure. In FIG. 3A, storage device 305 and computational device 310-1 (which may be termed merely a "device") are shown. Storage device 305 may include controller 315 and storage 320-1, and may be reachable across queue pairs: queue pairs 325 may be used both for management of storage device 305 and to control I/O of storage device 305.

Computational device 310-1 may be paired with storage device 305. Computational device 310-1 may include any number (one or more) processors 330, which may offer one or more services 335-1 and 335-2. To be clearer, each processor 330 may offer any number (one or more) services 335-1 and 335-2 (although embodiments of the disclosure may include computational device 310-1 including exactly two services 335-1 and 335-2). Computational device 310-1 may be reachable across queue pairs 340, which may be used for both management of computational device 310-1 and/or to control I/O of computational device 310-1.

Processor 330 may be thought of as near-storage processing: that is, processing that is closer to storage device 305 than processor 110 of FIG. 1. Because processor 330 is closer to storage device 305, processor 330 may be able to execute commands on data stored in storage device 305 more quickly than for processor 110 of FIG. 1 to execute such commands. While not shown in FIG. 3A, processors 330 may have associated memory which may be used for local execution of commands on data stored in storage device 305.

While FIG. 3A shows storage device 305 and computational device 310-1 as being separately reachable across fabric 140, embodiments of the disclosure may also include storage device 305 and computational device 310-1 being serially connected. That is, commands directed to storage device 305 and computational device 310-1 might both be received at the same physical connection to fabric 140 and may pass through one device to reach the other. For example, if computational device 310-1 is located between storage device 305 and fabric 140, computational device 310-1 may receive commands directed to both computational device 310-1 and storage device 305: computational device 310-1 may process commands directed to computational device 310-1, and may pass commands directed to storage device 305 to storage device 305.

Services 335-1 and 335-2 may offer a number of different functions that may be executed on data stored in storage device 305. For example, services 335-1 and 335-2 may offer pre-defined functions, such as encryption, decryption, compression, and/or decompression of data, erasure coding, and/or applying regular expressions. Or, services 335-1 and 335-2 may offer more general functions, such as data searching and/or SQL functions. Services 335-1 and 335-2 may also support running application-specific code. That is, the application using services 335-1 and 335-2 may provide custom code to be executed using data on storage device 305. Services 335-1 and 335-2 may also any combination of such functions. Table 1 lists some examples of services that may be offered by processor 330.

TABLE 1

| Service Types |
| --- |
| Compression |
| Encryption |
| Database filter |
| Erasure coding |
| RAID |
| Hash/CRC |
| RegEx (pattern matching) |
| Scatter Gather |
| Pipeline |
| Video compression |
| Data Deduplication |
| Operating System Image Loader |
| Container Image Loader |
| Berkeley packet filter (BPF) loader |
| FPGA Bitstream loader |
| Large Data Set |

Processors 330 (and, indeed, computational device 310-1) may be implemented in any desired manner. Example implementations may include a local processor, such as Central Processing Unit (CPU), a Graphics Processing Unit (GPU), a General Purpose GPU (GPGPU), a Data Processing Unit (DPU), and a Tensor Processing Unit (TPU), among other possibilities. Processors 330 may also be implemented using Field Programmable Gate Array (FPGA) or an Application-Specific Integrated Circuit (ASIC), among other possibilities. If computational device 310-1 includes more than one processor 330, each processor may be implemented as described above. For example, computational device 310-1 might have one each of CPU, TPU, and FPGA, or computational device 310-1 might have two FPGAs, or computational device 310-1 might have two CPUs and one ASIC, etc.

Depending on the desired interpretation, either computational device 310-1 or processor(s) 330 may be thought of as a computational storage unit.

Figure 3B:
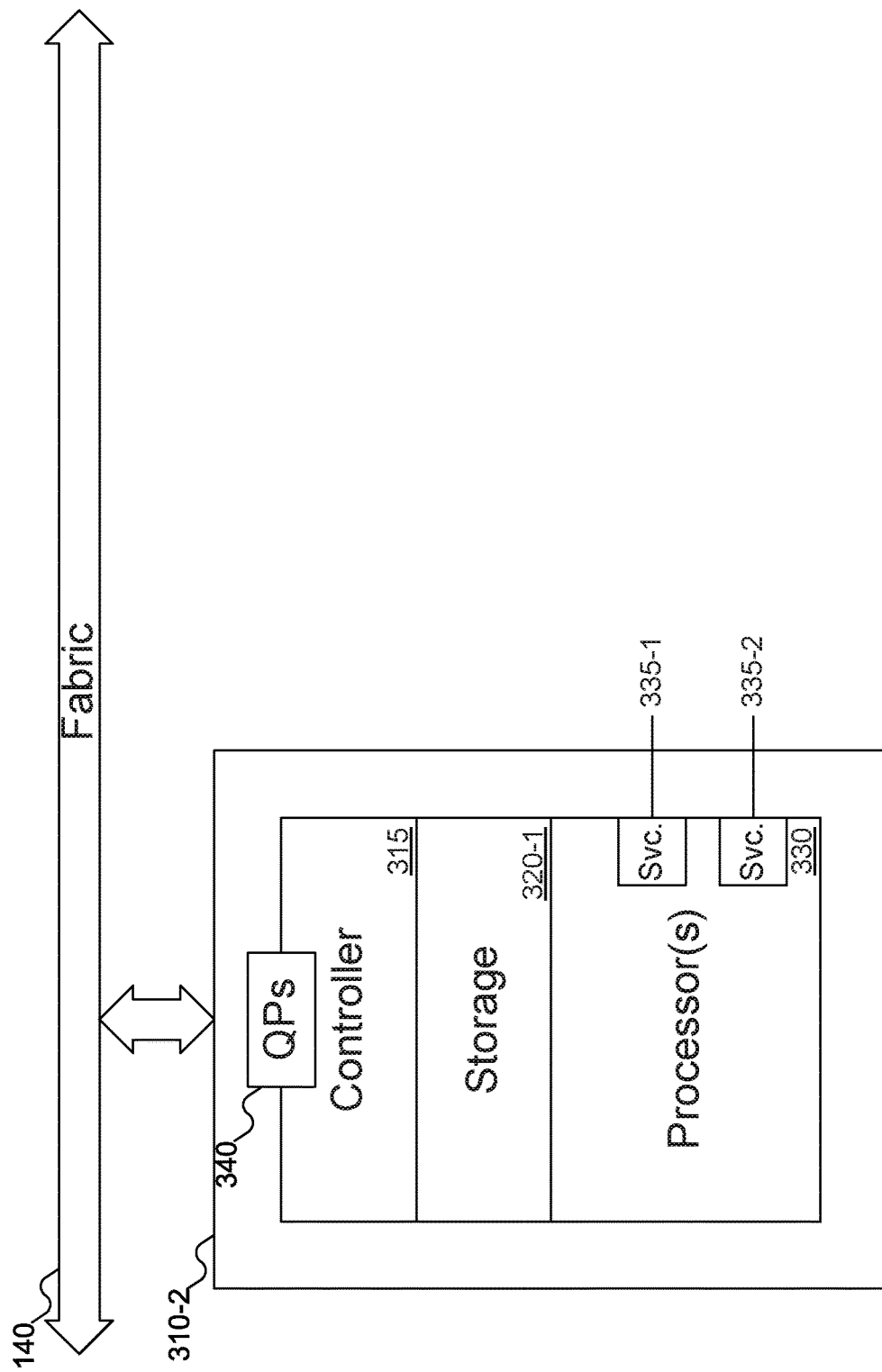
FIG. 3B shows a second example arrangement of a computational storage unit that may be associated with the storage device of FIG. 1, according to embodiments of the disclosure.

Whereas FIG. 3A shows storage device 305 and computational device 310-1 as separate devices, in FIG. 3B they may be combined. Thus, computational device 310-2 may include controller 315, storage 320-1, and processor(s) 330 offering services 335-1 and 335-2. As with storage device 305 and computational device 310-1 of FIG. 3A, management and I/O commands may be received via queue pairs 340. Even though computational device 310-2 is shown as including both storage and processor(s) 330, FIG. 3B may still be thought of as including a storage device that is associated with a computational storage unit.

Figure 3C:
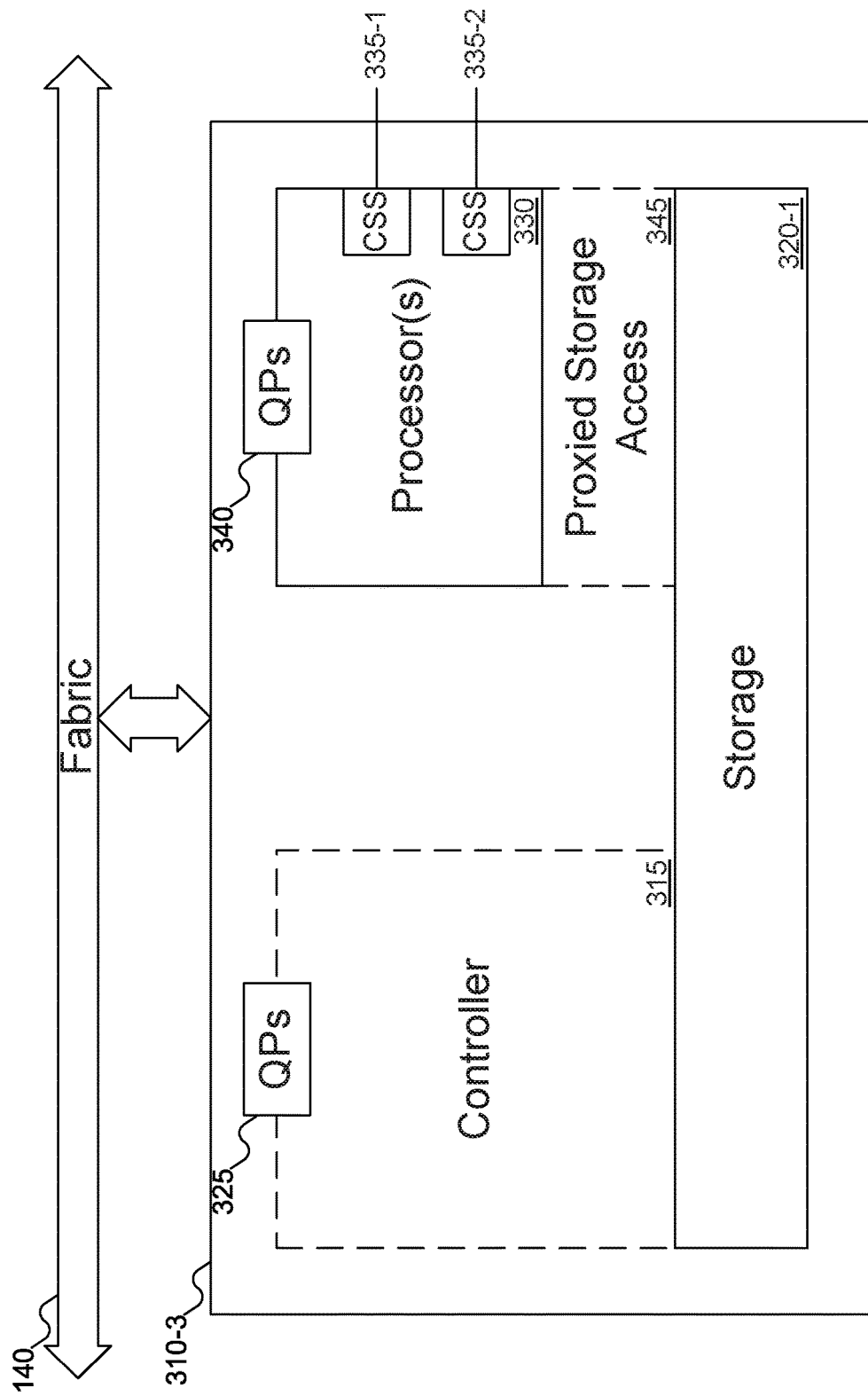
FIG. 3C shows a third example arrangement of a computational storage unit that may be associated with the storage device of FIG. 1, according to embodiments of the disclosure.

In yet another variation shown in FIG. 3C, computational device 310-3 is shown. Computational device 310-3 may include controller 315 and storage 320-1, as well as processor(s) 330 offering services 335-1 and 335-2. But even though computational device 310-3 may be thought of as a single component including controller 315, storage 320-1, and processor(s) 330 (and also being thought of as a storage device associated with a computational storage unit), unlike the implementation shown in FIG. 3B controller 315 and processor(s) 330 may each include their own queue pairs 325 and 340 (again, which may be used for management and/or I/O). By including queue pairs 325, controller 315 may offer transparent access to storage 320-1 (rather than requiring all communication to proceed through processor(s) 330).

In addition, processor(s) may have proxied storage access 345 to use to access storage 320-1. Thus, instead of routing access requests through controller 315, processor(s) 330 may be able to directly access the data from storage 320-1.

In FIG. 3C, both controller 315 and proxied storage access 345 are shown with dashed lines to represent that they are optional elements, and may be omitted depending on the implementation.

Figure 3D:
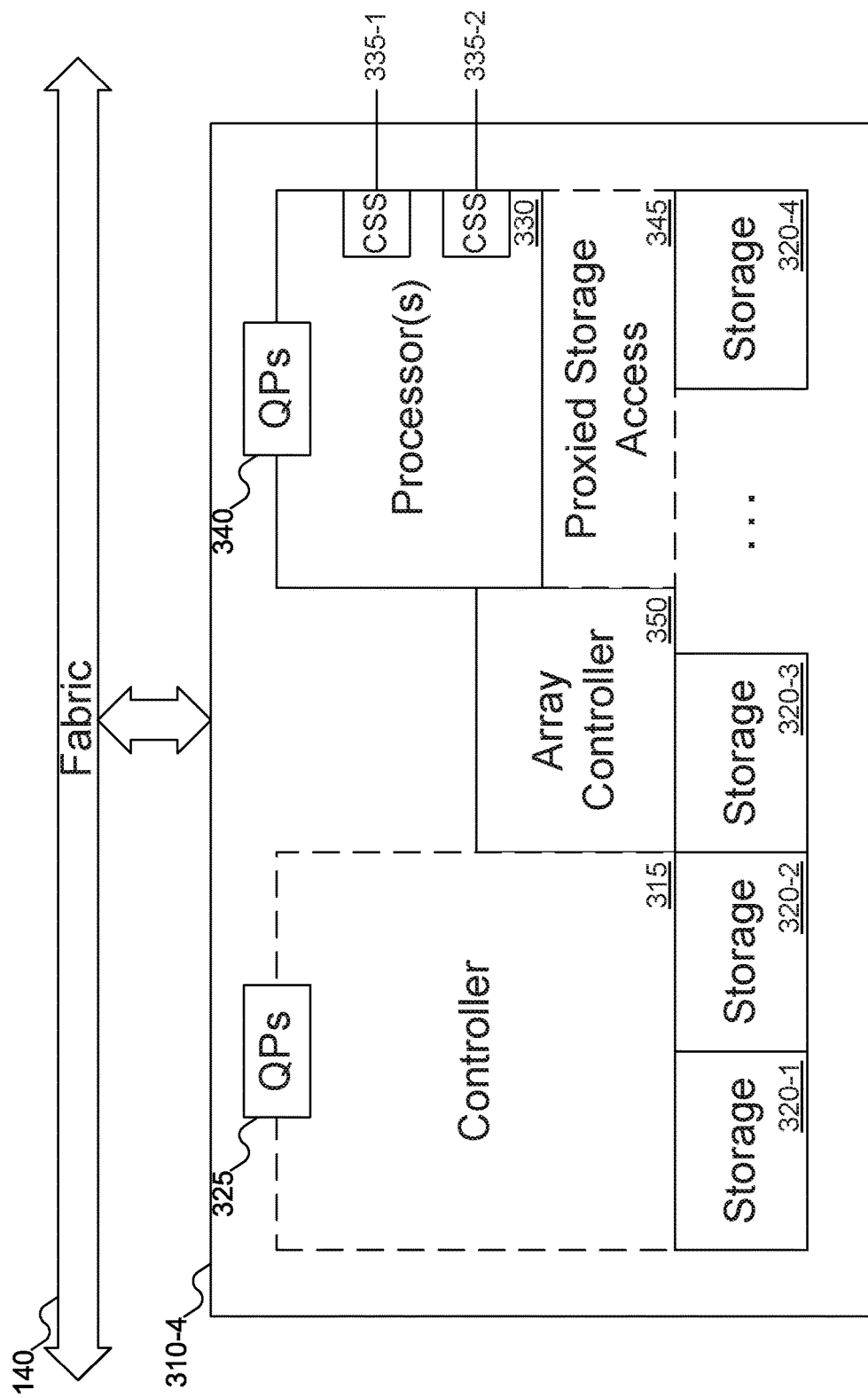
FIG. 3D shows a fourth example arrangement of a computational storage unit that may be associated with the storage device of FIG. 1, according to embodiments of the disclosure.

Finally, FIG. 3D shows yet another implementation. In FIG. 3D, computational device 310-4 is shown, which may include an array. Similar to computational device 310-3 of FIG. 3C, the array may include one or more storage 320-1 through 320-4. While FIG. 3D shows four storage elements, embodiments of the disclosure may include any number (one or more) of storage elements. In addition, the individual storage elements may be other storage devices, such as those shown in FIGS. 3A-3D.

Because computational device 310-4 may include more than one storage element 320-1 through 320-4, computational device 310-4 may include array controller 350. Array controller 350 may manage how data is stored on and retrieved from storage elements 320-1 through 320-4. For example, if storage elements 320-1 through 320-4 are implemented as some level of a Redundant Array of Independent Disks (RAID), array controller 350 may be a RAID controller. If storage elements 320-1 through 320-4 are implemented using some form of Erasure Coding, then array controller 350 may be an Erasure Coding controller.

Figure 4:
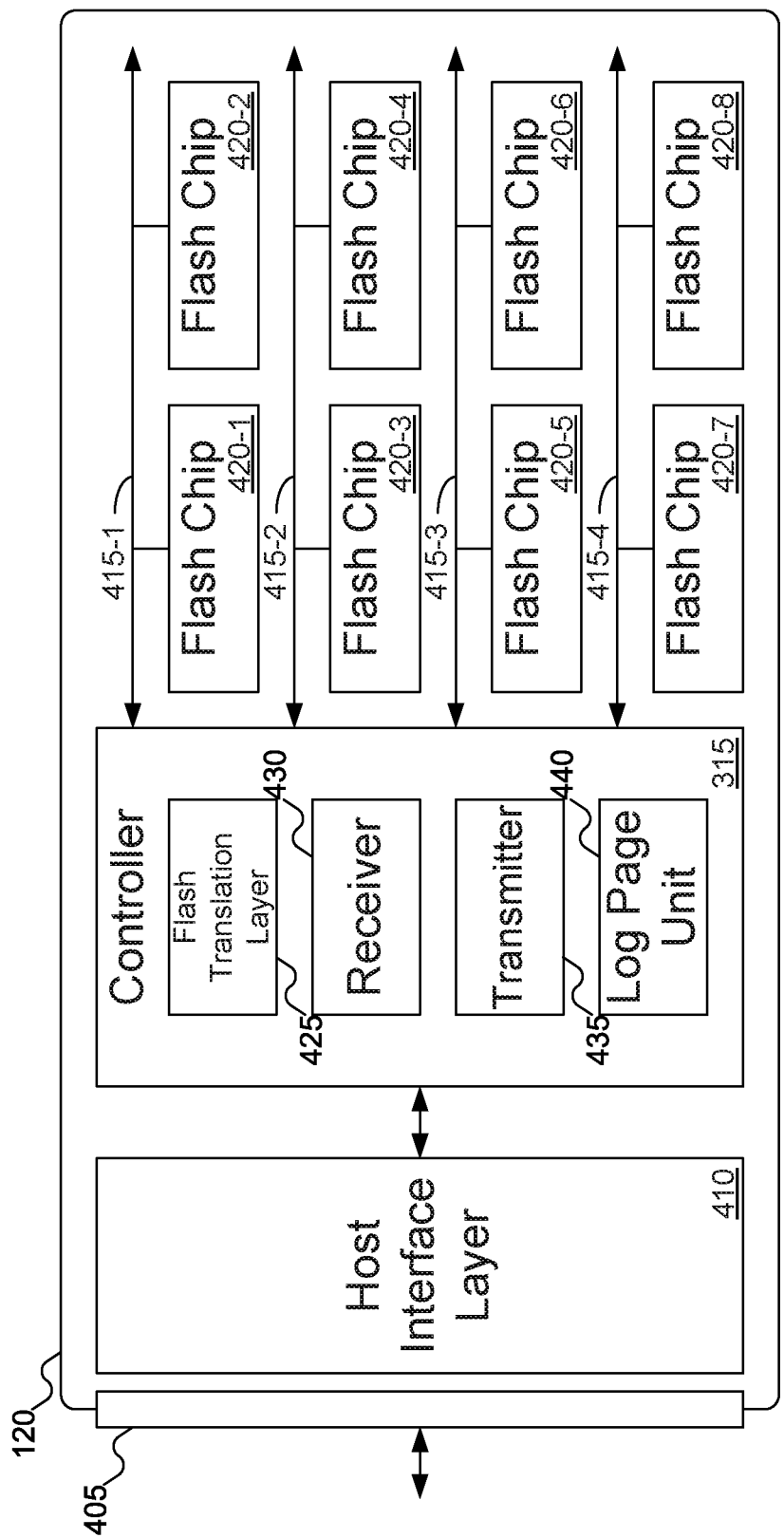
FIG. 4 shows details of the storage device of FIG. 1 implemented using a Solid State Drive (SSD), according to embodiments of the disclosure.

FIG. 4 shows details of storage device 120 of FIG. 1 implemented using a Solid State Drive (SSD), according to embodiments of the disclosure. Interface 405 may be an interface used to connect SSD 120 to machine 105 of FIG. 1. SSD 120 may include more than one interface 405: for example, one interface might be used for block-based read and write requests, and another interface might be used for key-value read and write requests. While FIG. 4 suggests that interface 405 is a physical connection between SSD 120 and machine 105 of FIG. 1, interface 405 may also represent protocol differences that may be used across a common physical interface. For example, SSD 120 might be connected to machine 105 using a U.2 or an M.2 connector, but may support block-based requests and key-value requests: handling the different types of requests may be performed by a different interface 405.

SSD 120 may also include host interface layer 410, which may manage interface 405. If SSD 120 includes more than one interface 405, a single host interface layer 410 may manage all interfaces, SSD 120 may include a host interface layer for each interface, or some combination thereof may be used. Host interface layer 410 may manage receiving requests across interface 405 and sending results back across interface 405.

SSD 120 may also include SSD controller 315, various channels 415-1, 415-2, 415-3, and 415-4, along which various flash memory chips 420-1, 420-2, 420-3, 420-4, 420-3, 420-6, 420-7, and 420-8 may be arrayed. SSD controller 315 may manage sending read requests and write requests to flash memory chips 420-1 through 420-8 along channels 415-1 through 415-4. Although FIG. 4 shows four channels and eight flash memory chips, embodiments of the disclosure may include any number (one or more, without bound) of channels including any number (one or more, without bound) of flash memory chips.

Within each flash memory chip, the space may be organized into blocks, which may be further subdivided into pages, and which may be grouped into superblocks. The page is typically the smallest unit of data that may be read or written on an SSD. Page sizes may vary as desired: for example, a page may be 4 KB of data. If less than a full page is to be written, the excess space is "unused".

While pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the disclosure, the unit of erasure may differ from the block: for example, it may be a superblock, which may be a set of multiple blocks.)

SSD controller 315 may include flash translation layer 425 (which may be termed more generally a logical-to-physical translation layer, for storage devices that do not use flash storage), receiver 430, transmitter 435, and log page unit 440. Flash translation layer 425 may handle translation of logical block addresses (LBAs) or other logical IDs (as used by processor 110 of FIG. 1) and physical block addresses (PBAs) or other physical addresses where data is stored in flash chips 420-1 through 420-8. Receiver 430 may be used to receive discovery requests from discovery unit 125 of FIG. 1, and transmitter 435 may be used to transmit discovery responses back to discovery unit 125 of FIG. 1. Log page unit 440 may be used to generate log pages, which may be provide additional information to discovery unit 125 of FIG. 1 regarding a computational storage unit associated with SSD 120 (as described above with reference to FIGS. 3A-3D). Table 2 shows information that may be included in a discovery response sent to discovery unit 125 of FIG. 1; Table 4 shows information that may be included in a log page generated by log page unit 440.

TABLE 2

Identify Controller

| Bytes | Optional/ Mandatory | Description |
| --- | --- | --- |
| 1807:1806 | Optional | Computational Storage Capabilities (CSCAP): This field indicates attributes for computational storage operations. If computational storage is supported, then this field is non-zero. If computational storage is not supported, then this field is cleared to 0 h and reserved. Bits 7-5 are reserved. If bit 4 is set to 1, then the controller supports CS Set feature. If bit 3 is set to 1, then the controller supports CS log pages. If bit 2 is set to 1, then the controller supports downloadable CS functions. If bit 1 is set to 1, then the controller supports CS program functions. If bit 0 is set to 1, then the controller supports computational storage capabilities. |
| 1809:1808 | Optional | Computational Storage Device Type (CSDT): This field is valid only if CSCAP is non-zero. Additional capabilities of device types may be queried by their log pages. Bits 15-6 are reserved. |

TABLE 3

Device Type

| Bit | Details |
| --- | --- |
| 5 | Data Processing Unit (DPU) |
| 4 | Tensor Processing Unit (TPU) |
| 3 | Graphics Processing Unit (GPU) |
| 2 | Dedicated Application-Specific Integrated Circuit (ASIC) |
| 1 | Embedded Central Processing Unit (CPU) |
| 0 | Reprogrammable Field Programmable Gate Array (FPGA) |

TABLE 4

Log Page Definitions

| Bytes | Description |
| --- | --- |
| 3:0 | Capabilities: Device type capabilities Bits 31:11 are reserved. <br> Bits — Details <br> 10 — Supports program functions page <br> 9 — Supports shared access <br> 8 — Reprogrammable <br> 7 — Supports queued Input/Output (I/O) <br> 6 — Supports streams <br> 5 — Supports batch requests <br> 4 — Supports descriptors <br> 3 — Memory managed by device <br> 2 — Memory exposed as Peripheral Component Interconnect Express (PCIe) Base Address Register (BAR) <br> 1 — Contains memory <br> 0 — Available |
| 7:4 | Version: contains major and minor version details |
| 9:8 | Device type (see Table 3) |
| 10 | Status |
| 15:11 | Reserved |
| 23:16 | Total data memory size in kilobytes (KB) |
| 31:24 | Total program memory in KB |
| 33:32 | Vendor ID |
| 35:34 | Device ID |
| 51:36 | Serial Number |

TABLE 4-continued

Log Page Definitions

| Bytes | Description |
| --- | --- |
| 55:52 | Total number of functions supported |
| 63:56 | Reserved |
| 4095:64 | Device type-specific functions |

Figure 5A:
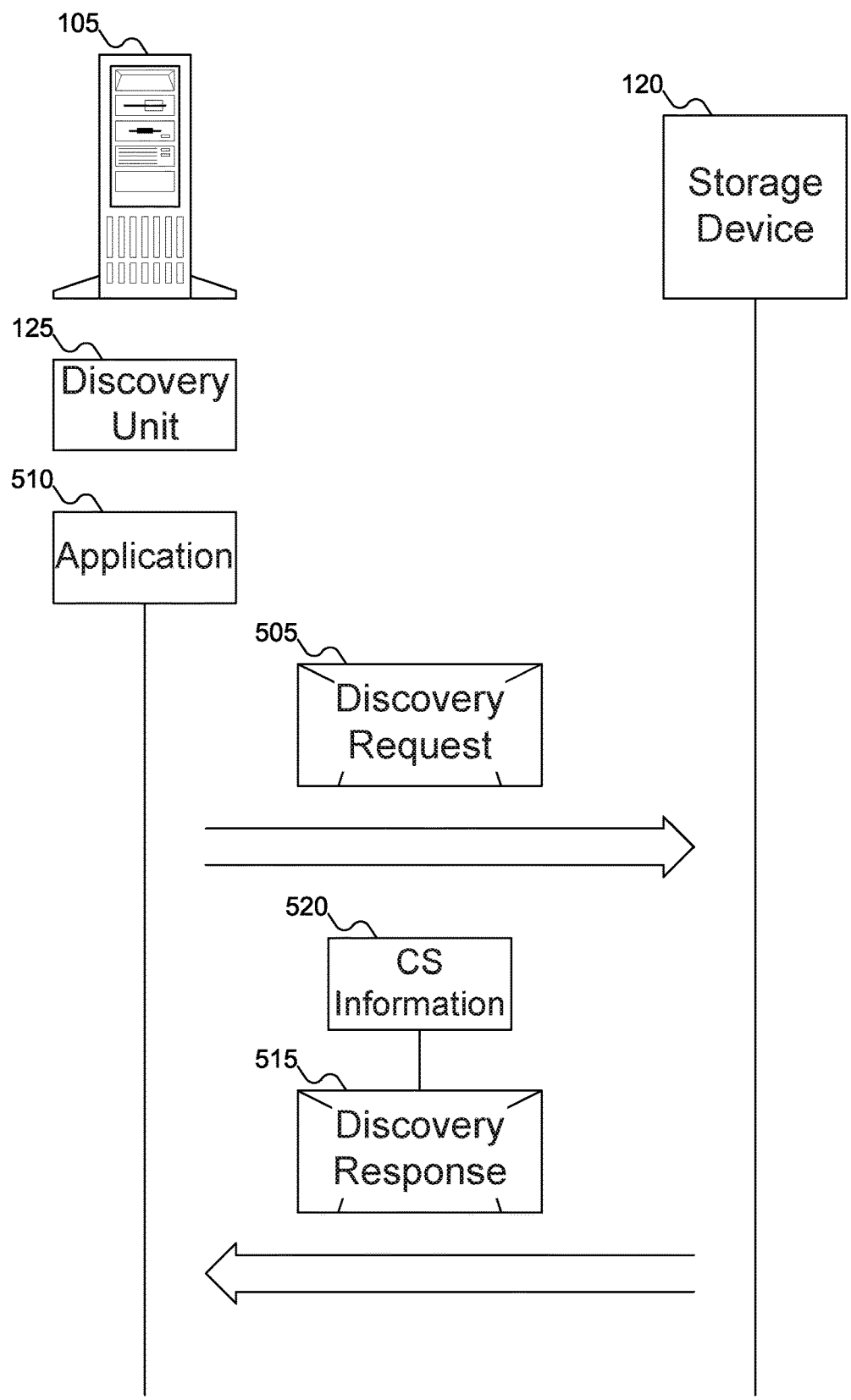
FIG. 5A shows discovery of the storage device of FIG. 1, according to embodiments of the disclosure.
Figure 5B:
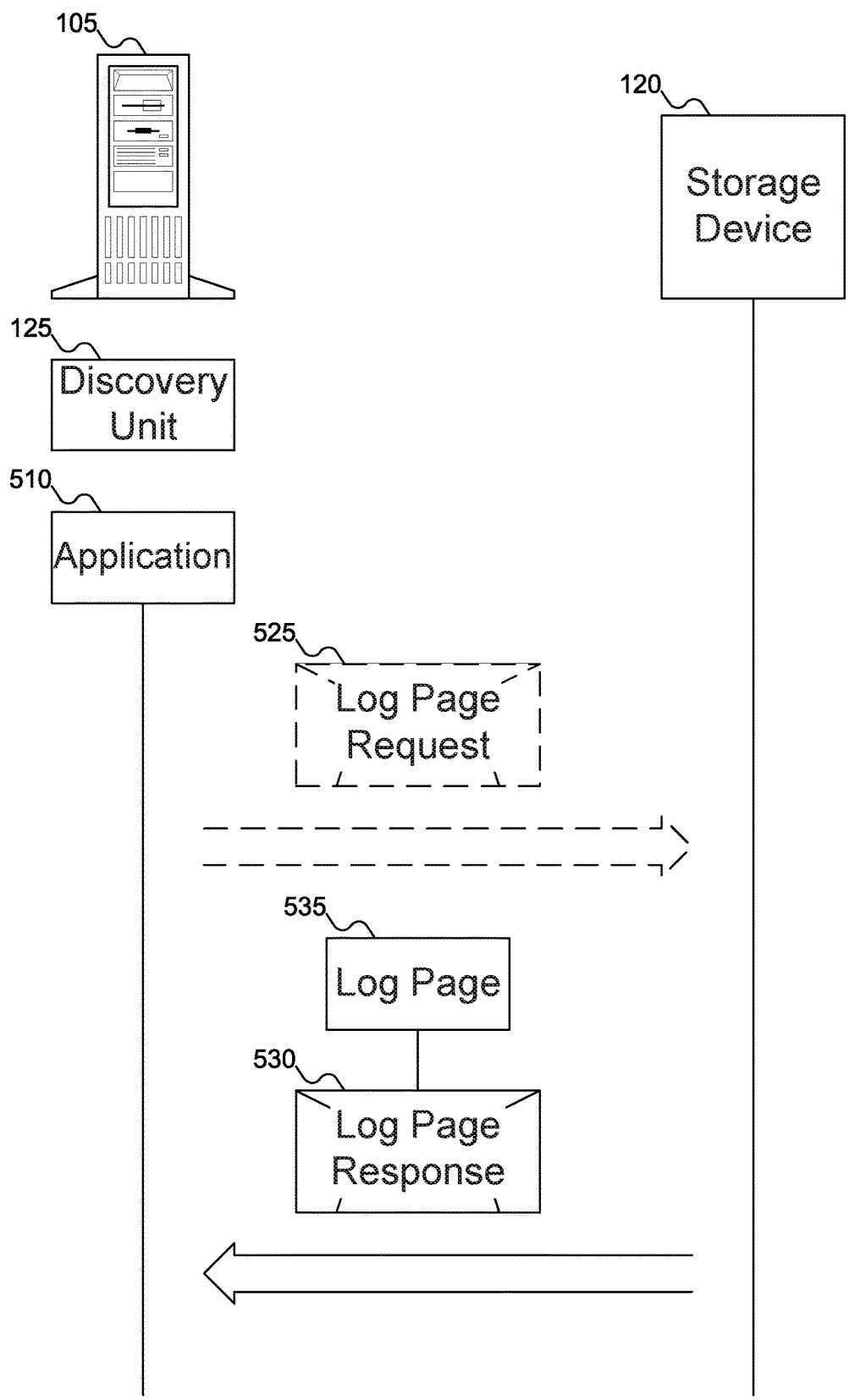
FIG. 5B continues the discovery of the storage device of FIG. 1 shown in FIG. 5A, according to embodiments of the disclosure.

FIGS. 5A-5B show discovery of storage device 120 of FIG. 1, according to embodiments of the disclosure. In FIG. 5A, discovery request 505 may be sent to storage device 120. Discovery request 505 may be a standard discovery request message, such as might be specified using protocols such as NVMe, NVMe-oF, SSDP, and others; or discovery request 505 may be a custom discovery request message designed to probe for attached devices and/or their controllers. Discovery request 505 may also be sent using a custom plug-in software that may be used to recognize devices attached via a particular fabric and/or using a particular protocol.

Note that the unit that sends discovery request 505 may be machine 105, discovery unit 125, or application 510. In addition, note that machine 105 might not be the machine including storage device 120, as discussed further with reference to FIG. 6 below. In cases where machine 105 is remote from the machine including storage device 120, the protocol—for example, NVMe-oF—may specify how a remote discovery request may be used to identify devices and/or their controllers.

Upon receiving discovery request 505, storage device 120 may respond by sending discovery response 515. Discovery response 515 may include information 520 about one or more computational storage unit associated with (or included in) storage device 120. As discussed above with reference to FIG. 4, Table 2 may represent information that may be included in discovery response 515 as information 520. Discovery response 515, like discovery request 505, may be in a form specified by a standard such as NVMe, NVMe-oF, SSDP, and others; or discovery response 515 may be a custom message including information about storage device 120 and associated computational storage.

In FIG. 5B, log page request 525 may be sent to storage device 120. Log page request 525 may be sent by the same unit that sends discovery request 505 of FIG. 5A, or log page request 525 may be sent by another unit. In addition, log page request 525 may be omitted, if storage device 120 sends log page response 530 automatically. Log page response 530 may include log page 535, which may provide information about a computational storage unit associated with storage device 120, as described above with reference to Table 4. If storage device 120 is associated with more than one computational storage unit, log page response 530 may include more than one log page 535: for example, log page response 530 may include one log page 535 for each computational storage unit associated with storage device 120.

The information about the computational storage unit associated with storage device 120—information 520 of FIG. 5A and log page 535 of FIG. 5B—may be forwarded to a discovery service, which may permit other devices and/or applications to be aware of the computational storage unit associated with storage device 120.

Figure 6:
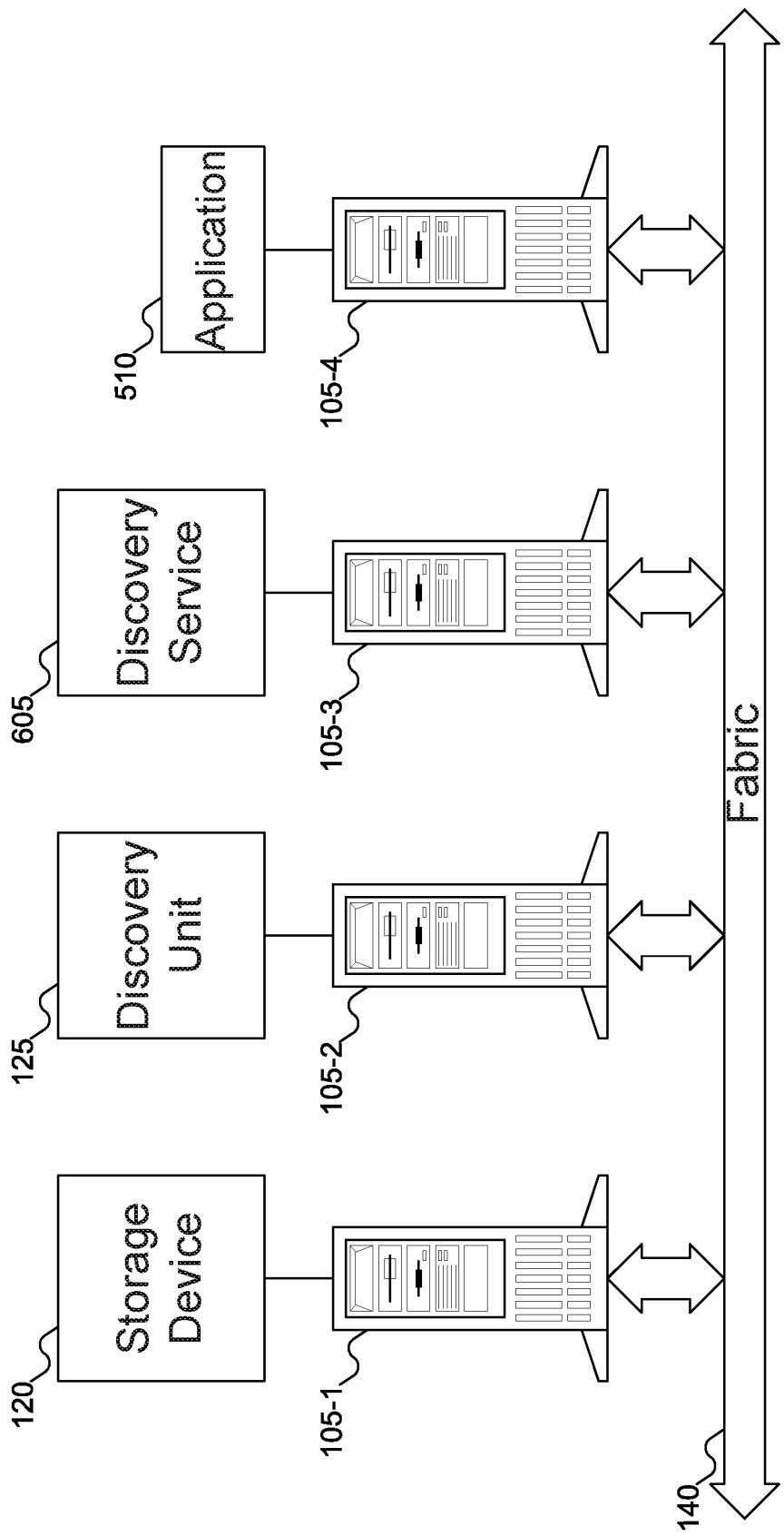
FIG. 6 shows various machines connected by the fabric of FIG. 1 including modules involved in the discovery and use of the storage device of FIG. 1, according to embodiments of the disclosure.

FIG. 6 shows various machines connected by fabric 140 of FIG. 1 including modules involved in the discovery and use of storage device 120 of FIG. 1, according to embodiments of the disclosure. In FIG. 6, four machines 105-1, 105-2, 105-3, and 105-4 are shown. Machine 105-1 may include storage device 120. Machine 105-2 may include discovery unit 125. Machine 105-3 may include discovery service 605, which may be used by other devices, machines, and/or applications to learn about the computational storage unit associated with storage device 120. Finally, machine 105-4 may include application 510. FIG. 6 thus demonstrates that storage device 120, discovery unit 125, discovery service 605, and application 510 may be located on different machines connected via network/fabric 140. But while FIG. 6 shows each unit being included with a different machine, embodiments of the disclosure may support any number of machines, each of which may include any or all of the units shown.

Up until now, the discussion has focused on the mechanism for discovery of a storage device associated with a computational storage unit. But how that mechanism operates may also be discussed.

In some embodiments of the disclosure, computational storage (CS) APIs may provide a standardized way to access compute offload capable devices. These may be connected, for example, in direct attached and/or network attached manners. In some embodiments of the disclosure, CS APIs may apply to these and other types of connected devices and may provide an interface that may be seamless and/or standardized across existing and/or future computational storage capable devices.

To assist in discovery of storage devices associated with computational storage units, some APIs may be used, as discussed below. Any function names, variable names, and constant names shown below are merely exemplary, and may be replaced with different such names.

csQueryCSPList( ) may be used to return one or more processors available based on search criteria. csQueryCSPList( ) may take as input the name of a discovery service to query, and may return as output a buffer that lists the available computational storage units known by the discovery service. The returned list of computational storage units may be parsed and a selected entry may then be contacted by the application.

csGetCSPFromPath( ) may be used to return a computational storage unit associated with a given file or path. csQueryCSPList( ) may take as input a string that denotes a path to a file or directory that resides on a device or a device path. The file/directory may also indirectly refer to a namespace and partition. If the path is only partially qualified, the path may be fully qualified before the function completes. csQueryCSPList( ) may then return the qualified name to the computational storage unit.

csQueryDeviceProperties( ) may be used to query a device for its properties. csQueryDeviceProperties( ) may take as input a handle to a computational storage unit, and may return a buffer that includes the properties of the computational storage unit.

csQueryDeviceCapabilities( ) may be used to query a computational storage unit for its capabilities, such as the built-in computational storage-related functions. csQueryDeviceCapabilities( ) may take as input a handle to a computational storage unit, and may return a buffer that includes the built-in computational storage-related functions of the computational storage unit.

By using APIs such as those shown above, the specifics of how the computational storage unit may be discovered may be hidden beneath the API itself. An application may simply search for a computational storage unit using the APIs, without concern for the particular fabric connecting the application to the computational storage unit or the protocol the computational storage unit uses.

In some embodiments of the disclosure, storage devices with associated computational storage units may be virtualized, so that the resources offered by the storage device/computational storage unit may be used by more than one application. That is, instead of the storage device/computational storage unit offering multiple interfaces (real or logical) that may be used by different applications, a virtual machine (VM) may manage access to the storage device/computational storage unit. Then, when an application desired to use the services offered by the storage device/computational storage unit, the application may communicate with the VM, which may act as the "sole" client of the storage device/computational storage unit.

Figures 7, 8:
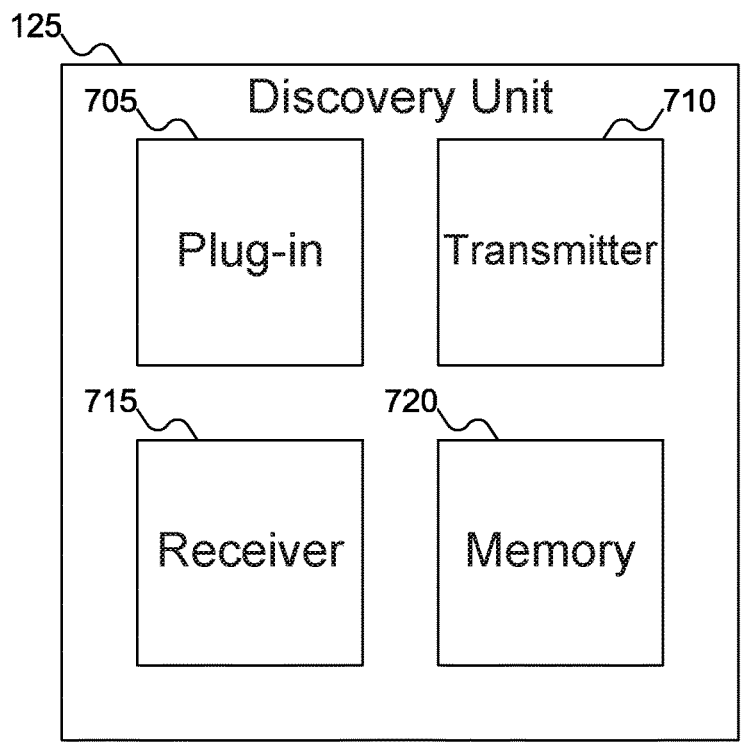
FIG. 7 shows details of the discovery unit of FIG. 1, according to embodiments of the disclosure.
FIG. 8 shows details of the discovery service of FIG. 6, according to embodiments of the disclosure.

FIG. 7 shows details of discovery unit 125 of FIG. 1, according to embodiments of the disclosure. In FIG. 7, discovery unit 125 is shown as including plug-in 705, transmitter 710, receiver 715, and memory 720. Plug-in 705 may be used to construct discovery request 505 of FIG. 5A. While FIG. 7 shows discovery unit 125 as including one plug-in 705, embodiments of the disclosure may include any number (one or more) of plug-ins: each plug-in may be used to construct discovery request 505 of FIG. 5A appropriate to a particular fabric 140 of FIG. 1 and/or a particular protocol used to communicate over fabric 140 of FIG. ##A. The use of the term "plug-in" suggests that additional plug-ins 705 may be added to discovery unit 125 as needed, which is correct; but discovery unit 125 may also include the built-in equivalent of one or more plug-ins 705 for some fabrics 140 of FIG. 1 and/or protocols. For example, discovery unit 125 may have built-in information for communicating across fabrics such as Ethernet, Infiniband, and/or Fibre Channel, as well as information about protocols such as NVMe and/or NVMe-oF. Transmitter 710 may be used to send discovery request 505 of FIG. 5A to storage device 120. Transmitter 710 may also be used to send information 520 of FIG. 5A and/or log page 535 of FIG. 5B, once received from storage device 120 of FIG. 1, to discovery service 605 of FIG. 6. Receiver 715 may be used to receive discovery response 515 of FIG. 5A from storage device 120 of FIG. 1. Memory 720 may be used store information 520 of FIG. 5A and/or log page 535 of FIG. 5B as received from storage device 120 of FIG. 1.

FIG. 8 shows details of discovery service 605 of FIG. 6, according to embodiments of the disclosure. In FIG. 8, discovery service 605 may include a data structure, such as a table, that may be stored in memory 115 of FIG. 1 (or another memory) within machine 105 of FIG. 1. This data structure may include information such as identifier 805 for a particular host (such as machine 105 of FIG. 1) including storage device 120 of FIG. 1, identifier 810 including a device ID for storage device 120 of FIG. 1, identifier 815 of a computational storage capability of storage device 120 of FIG. 1, identifier 820 of a computational storage type of storage device 120 of FIG. 1, information 520 of FIG. 5A (which may also include supplemental information such as log page 535 of FIG. 5B), and identifier 825 of a paired device (as discussed above, in some embodiments of the disclosure storage device 120 of FIG. 1 might be associated with but not include the computational storage unit: identifier 825 may include the device ID for the paired device including the computational storage unit). Note that not all information shown in FIG. 6 must be included: embodiments of the disclosure may include or omit information as desired. Nor is the information shown necessarily representative of the form any information stored in discovery service 605 may take: for example, rather than an Internet Protocol (IP) address, identifier 805 might just include a host ID of some sort, and leave resolution of the network address from the host ID to some other service. Similarly, identifiers 810 and/or 825 may be local device IDs that are not necessarily globally unique: for example, identifiers 810 and/or 825 may be enumeration IDs assigned to the device(s) when enumerated during discovery. Alternatively, identifiers 810 and/or 825 may be globally unique identifiers such as a device serial number.

Figure 9:
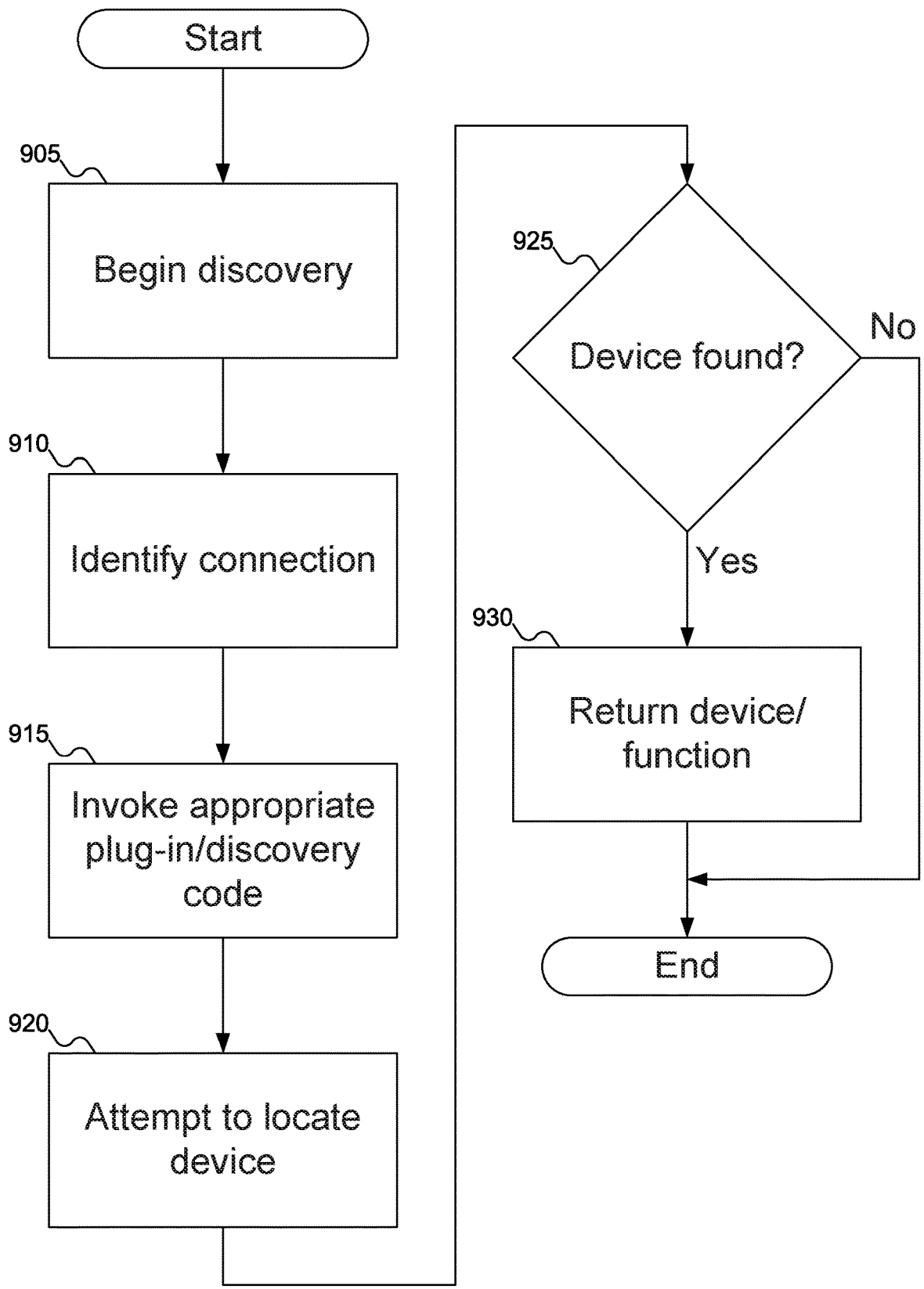
FIG. 9 shows a flowchart of an example high-level overview of how discovery may be performed, according to embodiments of the disclosure.

FIG. 9 shows a flowchart of an example high-level overview of how discovery may be performed, according to embodiments of the disclosure. In FIG. 9, at block 905, discovery may begin. Discovery may be started during enumeration of devices in machine 105 of FIG. 1, or discovery may be started when application 510 of FIGS. 5A-5B is interested in locating a device including a particular computational storage unit. At block 910, discovery unit 125 of FIG. 1 may determine the connections available. These connections may include the type of fabric 140 of FIG. 1 and/or the protocols that may be used across fabric 140 of FIG. 1. Based on the available connections, at block 915, discovery unit 125 of FIG. 1 may invoke the appropriate discovery code (built-in) or an appropriate plug-in. At block 920, discovery unit 125 of FIG. 1 may attempt to locate one or more devices across fabric 140 of FIG. 4 and using a particular protocol across fabric 140 of FIG. 1. Block 920 may involve sending discovery request 505 of FIG. 5A using the particular protocol over fabric 140 of FIG. 1.

At block 925, discovery unit 125 of FIG. 1 may determine whether a device (or its controller) was located or not. Block 925 may involve determining whether discovery unit 125 of FIG. 1 has received discovery response 515 of FIG. 5A from storage device 120. If the device was located, then at block 930 discovery unit 125 of FIG. 1 may return the identified device and/or its service (function) to application 510 of FIG. 5A. Block 930 may also be used to transmit the identified device and/or its service (function) to discovery service 605 of FIG. 6.

Note that while FIG. 9 shows a linear sequence without any repetition, embodiments of the disclosure may include discovery unit 125 of FIG. 1 sending multiple discovery requests 505 of FIG. 5A using multiple protocols across multiple fabrics 140 of FIG. 1. Thus, FIG. 9 is not intended to imply that the operations shown in FIG. 9 are performed once and once only.

Figure 10:
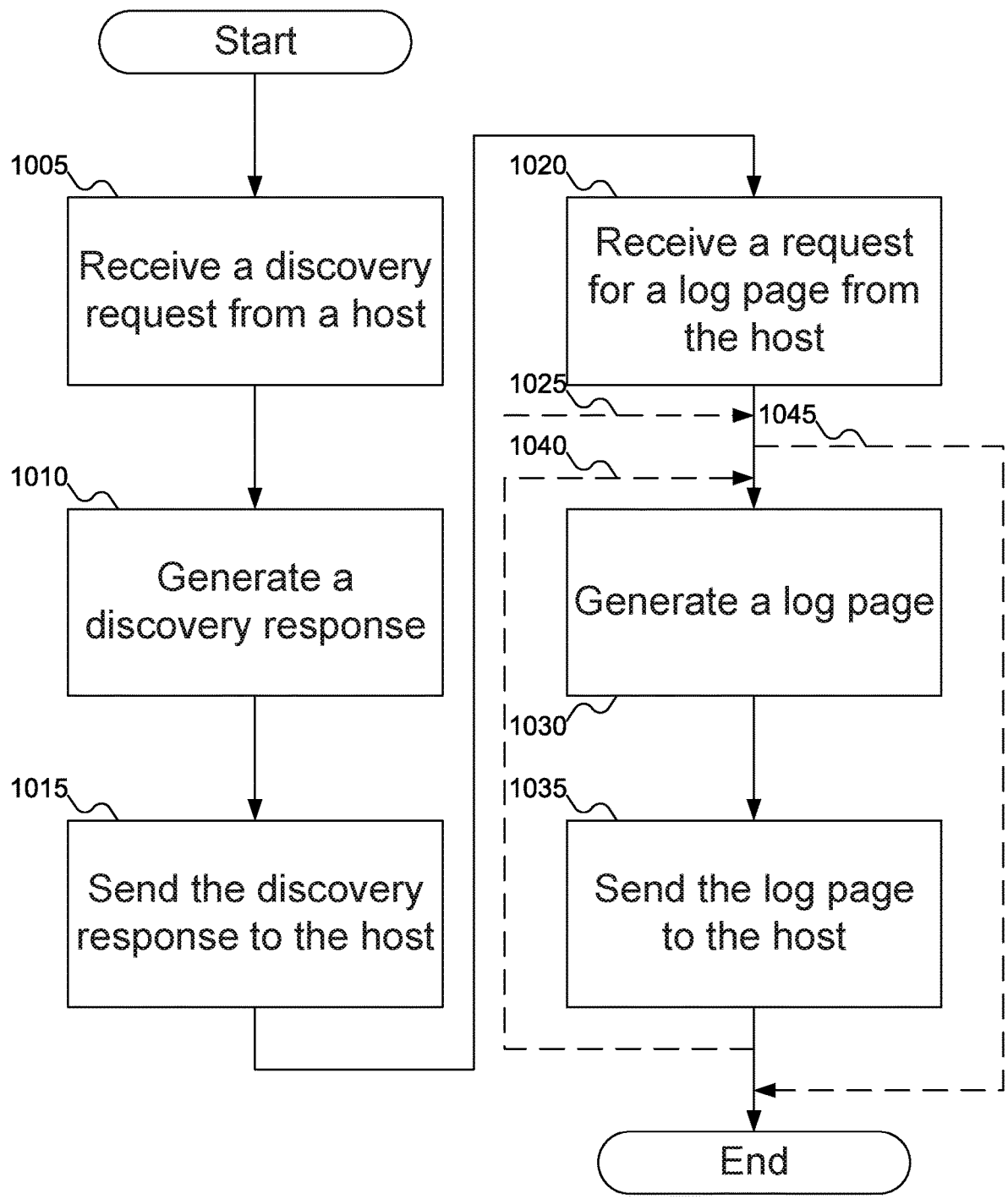
FIG. 10 shows a flowchart of an example procedure for the storage device of FIG. 1 to be discovered by the machine of FIG. 1, the discovery unit of FIG. 1, and/or the application of FIGS. 5A-5B, according to embodiments of the disclosure.

FIG. 10 shows a flowchart of an example procedure for storage device 120 of FIG. 1 to be discovered by machine 105 of FIG. 1, discovery unit 125 of FIG. 1, and/or application 510 of FIGS. 5A-5B, according to embodiments of the disclosure. In the discussion below, any reference to discovery unit 125 of FIG. 1 should be understood to include host 105 of FIG. 1 and/or application 510 of FIGS. 5A-5B as substitutes for discovery unit 125 of FIG. 1.

In FIG. 10, at block 1005, storage device 120 of FIG. 1 may receive discovery request 505 of FIG. 5A from discovery unit 125 of FIG. 1. At block 1010, storage device 120 of FIG. 1 may generate discovery response 515 of FIG. 5A. At block 1015, storage device 120 of FIG. 1 may send discovery response 515, which may include information 520 of FIG. 5A, to discovery unit 125 of FIG. 1.

At block 1020, storage device 120 of FIG. 1 may receive log page request 525 of FIG. 5B from discovery unit 125 of FIG. 1. Block 1020 may be omitted, as shown by dashed line 1025. At block 1030, log page unit 440 of FIG. 4 may generate log page 535 of FIG. 5B. At block 1035, storage device 120 of FIG. 1 may send log page response 530 of FIG. 5B, including log page 535 of FIG. 5B, to discovery unit 125 of FIG. 1. If multiple log pages 535 of FIG. 5B are to be generated (for example, if storage device 120 of FIG. 1 is associated with more than one computational storage unit), then blocks 1030 and 1035 may be repeated as often as necessary, as shown by dashed line 1040. Finally, if no log page 535 is to be generated, then blocks 1030 and 1035 may be omitted, as shown by dashed line 1045.

Figure 11:
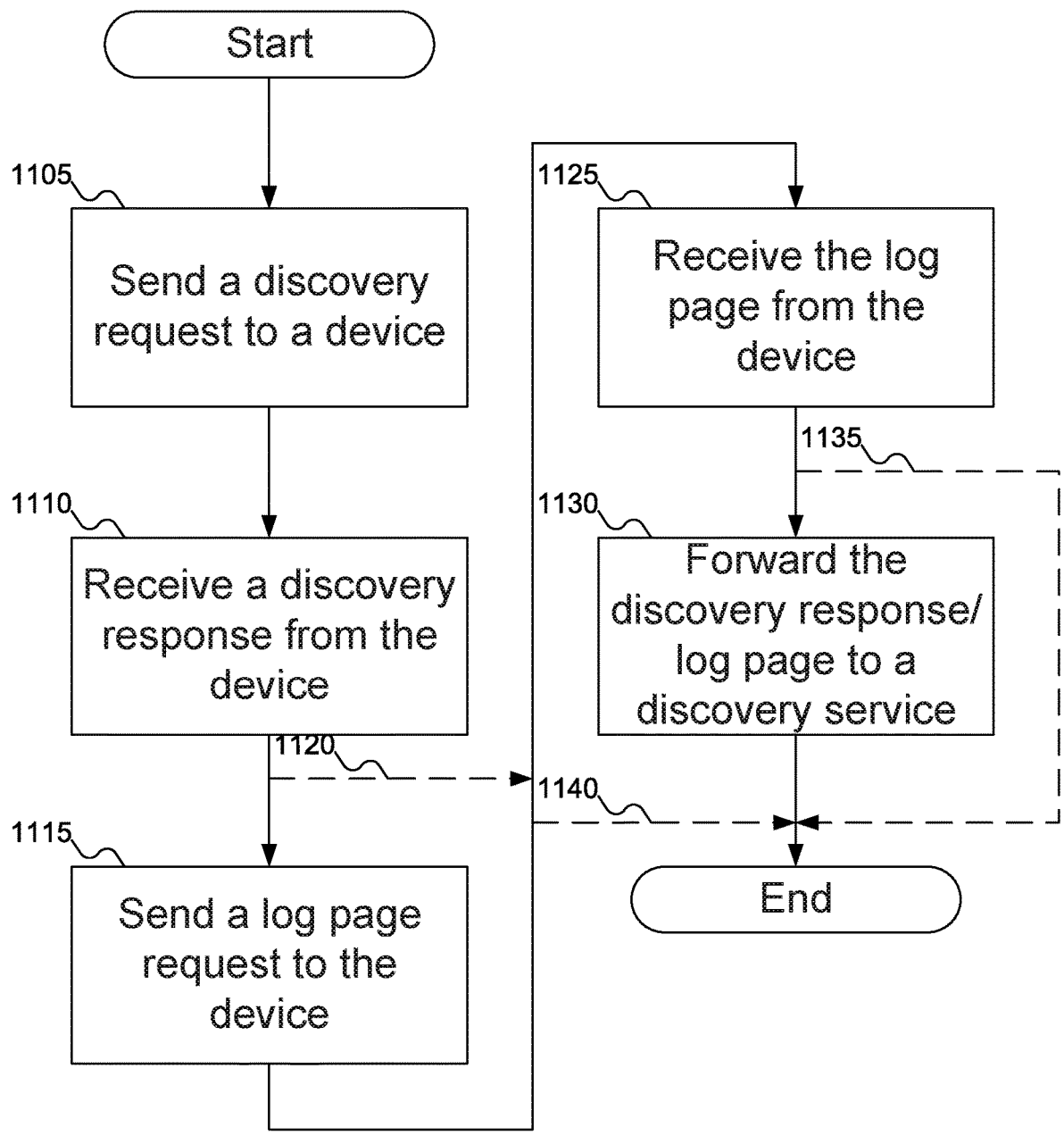
FIG. 11 shows a flowchart of an example procedure for by the machine of FIG. 1, the discovery unit of FIG. 1, and/or the application of FIGS. 5A-5B to discover the storage device of FIG. 1, according to embodiments of the disclosure.

FIG. 11 shows a flowchart of an example procedure for machine 105 of FIG. 1, discovery unit 125 of FIG. 1, and/or application 510 of FIGS. 5A-5B to discover storage device 120 of FIG. 1, according to embodiments of the disclosure. As with FIG. 10, in the discussion below, any reference to discovery unit 125 of FIG. 1 should be understood to include host 105 of FIG. 1 and/or application 510 of FIGS. 5A-5B as substitutes for discovery unit 125 of FIG. 1.

In FIG. 11, at block 1105, discovery unit 125 of FIG. 1 may send discovery request 505 of FIG. 5A to storage device 120 of FIG. 1. At block 1110, discovery unit 125 of FIG. 1 may receive discovery response 515 of FIG. 5A, which may include information 520 of FIG. 5A, from storage device 120 of FIG. 1.

At block 1115, discovery unit 125 of FIG. 1 may send log page request 525 of FIG. 5B to storage device 120 of FIG. 1. Block 1115 may be omitted, as shown by dashed line 1120. At block 1125, discovery unit 125 of FIG. 1 may receive log page response 530 of FIG. 5B, which may include log page 535 of FIG. 5B, from storage device 120 of FIG. 1. At block 1130, discovery unit 125 of FIG. 1 may forward information 520 of FIG. 5A and/or log page 535 of FIG. 5B to discovery service 605 of FIG. 6. Blocks 1125 and 1130 may be variously omitted, as shown by dashed lines 1135 and 1140.

Figure 12:
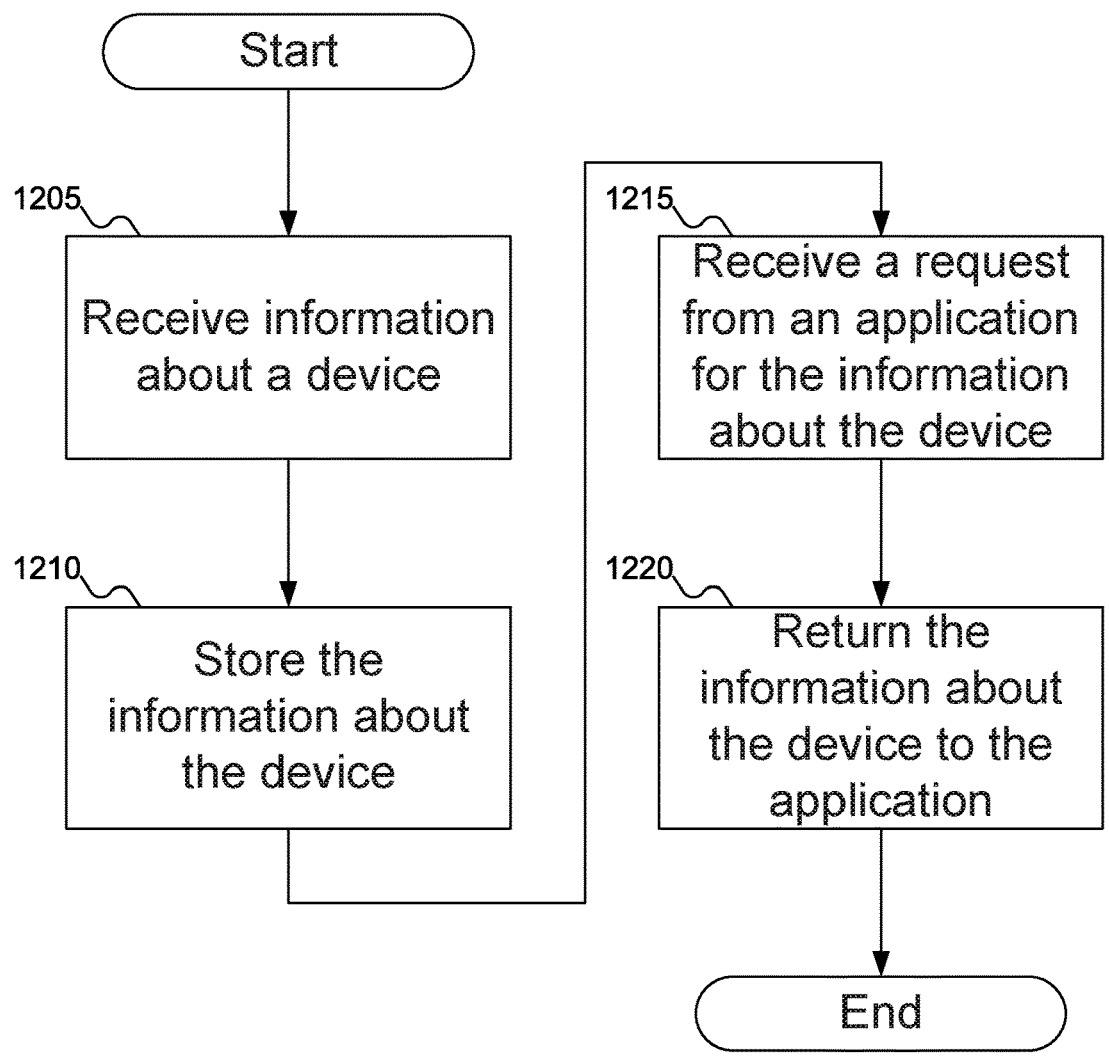
FIG. 12 shows a flowchart of an example procedure for the discovery service of FIG. 6 to use information about a computational storage unit, according to embodiments of the disclosure.

FIG. 12 shows a flowchart of an example procedure for discovery service 605 of FIG. 6 to use information about a computational storage unit, according to embodiments of the disclosure. In FIG. 12, at block 1205, discovery service 605 of FIG. 6 may receive information 520 of FIG. 5A and/or log page 535 of FIG. 5B from discovery unit 125 of FIG. 1, machine 105 of FIG. 1, and/or application 510 of FIGS. 5A-5B. At block 1210, discovery service 605 of FIG. 6 may store information 520 of FIG. 5A and/or log page 535 of FIG. 5B. At block 1215, discovery service 605 of FIG. 6 may receive a request from application 510 of FIGS. 5A-5B for information 520 of FIG. 5A and/or log page 535 of FIG. 5B at storage device 120 of FIG. 1. Finally, at block 1220, discovery service 605 of FIG. 6 may return information 520 of FIG. 5A and/or log page 535 of FIG. 5B at storage device 120 of FIG. 1 to application 510 of FIGS. 5A-5B.

Figure 13:
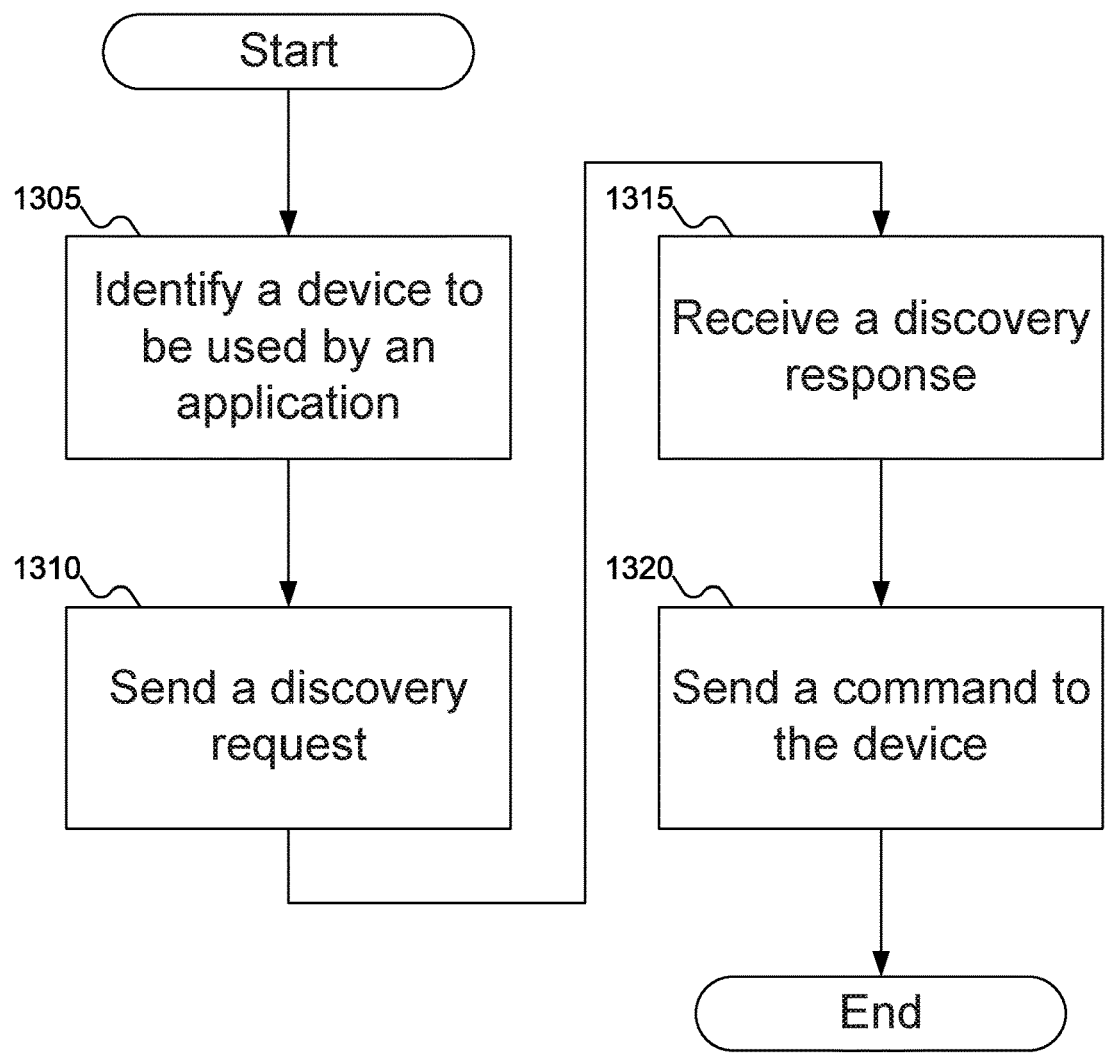
FIG. 13 shows a flowchart of an example procedure for the application of FIGS. 5A-5B to locate and use a computational storage unit, according to embodiments of the disclosure.

FIG. 13 shows a flowchart of an example procedure for application 510 of FIGS. 5A-5B to locate and use a computational storage unit, according to embodiments of the disclosure. In FIG. 13, at block 1305, application 510 of FIGS. 5A-5B may identify storage device 120 of FIG. 1 to be used by application 510 of FIGS. 5A-5B. Note that saying "identifying" storage device 120 of FIG. 1 should be understood to mean identifying a particular functionality of interest to application 510 of FIGS. 5A-5B, rather than literally identifying a particular storage device to be the one sought. For example, application 510 of FIGS. 5A-5B might indicate a desire to use a storage device that supports data encryption, or that has some minimum available capacity: these criteria may (indirectly) identify storage device 120 of FIG. 1 as being usable by application 510 of FIGS. 5A-5B (and there may also be other storage devices available that might also be usable by application 510 of FIGS. 5A-5B). But in embodiments of the disclosure, application 510 of FIGS. 5A-5B may specifically identify storage device 120 of FIG. 1 as being the one storage device of interest.

Once application 510 of FIGS. 5A-5B has identified storage device 120 of FIG. 1 as being of interest, at block 1310, application 510 of FIGS. 5A-5B may send discovery request 505 of FIG. 5A to storage device 120 of FIG. 1 to discover its computational storage capabilities. Alternatively, application 510 of FIGS. 5A-5B may send a query to discovery service 605 of FIG. 6 to learn the computational storage capabilities of storage device 120 of FIG. 1. At block 1315, application 510 of FIGS. 5A-5B may receive discovery response 515 of FIG. 5A or a result of the query sent to discovery service 605 of FIG. 6. Finally, at block 1320, application 510 of FIGS. 5A-5B may send a command to storage device 120 of FIG. 1.

Figure 14:
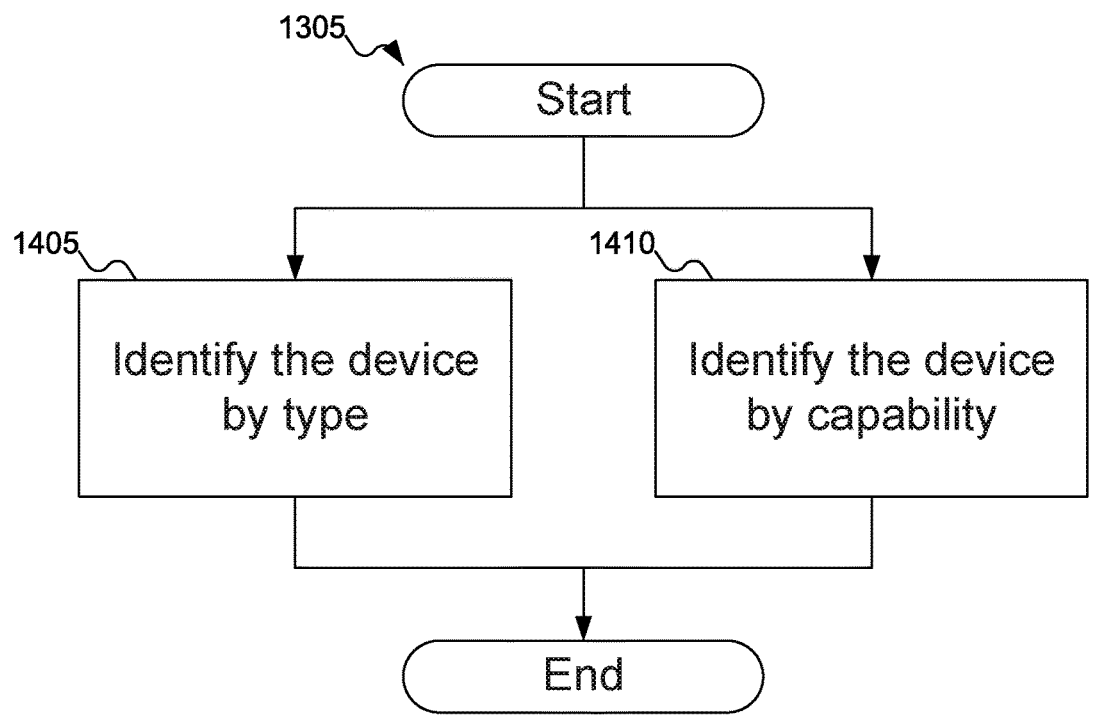
FIG. 14 shows a flowchart of an example procedure for the application of FIGS. 5A-5B to identify a computational storage unit, according to an embodiment of the disclosure.

FIG. 14 shows a flowchart of an example procedure for application 510 of FIGS. 5A-5B to identify a computational storage unit, according to an embodiment of the disclosure. As discussed above with reference to FIG. 13, application 510 of FIGS. 5A-5B might not literally identify storage device 120 of FIG. 1, but instead might "identify" storage device 120 of FIG. 1 based on some criteria for the desired storage device. In FIG. 14, at block 1405, application 510 of FIGS. 5A-5B may identify storage device 120 of FIG. 1 by type. Alternatively (or in combination), at block 1410 application 510 of FIGS. 5A-5B may identify storage device 120 of FIG. 1 by capability. In addition, application 510 of FIGS. 5A-5B may also specify other criteria (not described in FIG. 14) that may be used to identify storage device 120 of FIG. 1.

In FIGS. 9-14, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure offer technical advantages over the prior art. By enabling discovery of computational storage units associated with storage devices, applications may locate a storage device associated with a computational storage unit that may satisfy the requirements of the application. Further, by using APIs, applications may be able to locate such storage devices with associated computational storage units using commands, regardless of the protocol supported by the storage device/computational storage unit and/or the fabric used to communicate with the storage device/computational storage unit: the API may handle translation of a shared command structure into a command appropriate to the particular storage device/computational storage unit.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a device, comprising:
- a connector to connect the device to a component;
- a computational storage unit;
- a receiver to receive a discovery request from a discovery service; and
- a transmitter to send a discovery response to the discovery service, the discovery response including information about the computational storage unit.

Statement 2. An embodiment of the disclosure includes the device according to statement 1, wherein the information about the computational storage unit includes at least one bit identifying a computational storage capability of the computational storage unit.

Statement 3. An embodiment of the disclosure includes the device according to statement 1, wherein the information about the computational storage unit includes at least one bit identifying a type of the computational storage unit.

Statement 4. An embodiment of the disclosure includes the device according to statement 1, further comprising a log page unit to generate a log page, the log page including supplemental information about the computational storage unit.

Statement 5. An embodiment of the disclosure includes the device according to statement 4, wherein:
- the device further comprises a second computational storage unit; and
- the log page unit is configured to generate a second log page including second supplemental information about the second computational storage unit.

Statement 6. An embodiment of the disclosure includes the device according to statement 1, wherein the connector connects the device to the component using an interface drawn from a set including Peripheral Component Interconnect Express (PCIe), Ethernet, Infiniband, or Fibre Channel.

Statement 7. An embodiment of the disclosure includes the device according to statement 1, wherein the connector supports a protocol drawn from the set including Non-Volatile Memory Express (NVMe), NVMe over Fabrics (NVMe-oF), or Simple Service Discovery Protocol (SSDP).

Statement 8. An embodiment of the disclosure includes the device according to statement 1, wherein the computational storage unit includes a storage device.

Statement 9. An embodiment of the disclosure includes the device according to statement 8, wherein the storage device includes a Solid State Drive (SSD).

Statement 10. An embodiment of the disclosure includes the device according to statement 8, wherein the device further comprises a second computational storage unit drawn from a set including an in-storage processor or an accelerator.

Statement 11. An embodiment of the disclosure includes the device according to statement 8, wherein the storage device is paired with a second computational storage unit.

Statement 12. An embodiment of the disclosure includes the device according to statement 1, wherein the computational storage unit is paired with a storage device.

Statement 13. An embodiment of the disclosure includes the device according to statement 1, wherein the device is local to a host including the discovery service.

Statement 14. An embodiment of the disclosure includes the device according to statement 1, wherein the device is remote from a host including the discovery service.

Statement 15. An embodiment of the disclosure includes a system, comprising:
  a device including a computational storage unit; and
  a discovery unit, including:
    a transmitter to send a discovery request to the device; and
    a receiver to receive a discovery response from the device, the discovery response including information about the computational storage unit.

Statement 16. An embodiment of the disclosure includes the system according to statement 15, wherein the information about the computational storage unit includes at least one bit identifying a computational storage capability of the computational storage unit.

Statement 17. An embodiment of the disclosure includes the system according to statement 15, wherein the information about the computational storage unit includes at least one bit identifying a type of the computational storage unit.

Statement 18. An embodiment of the disclosure includes the system according to statement 15, wherein the discovery unit is configured to access a log page including supplemental information about the computational storage unit.

Statement 19. An embodiment of the disclosure includes the system according to statement 18, wherein:
  the device further includes a second computational storage unit; and
  the discovery unit is configured to access a second log page including second supplemental information about the second computational storage unit.

Statement 20. An embodiment of the disclosure includes the system according to statement 18, wherein the transmitter is configured to send a log page request to the device.

Statement 21. An embodiment of the disclosure includes the system according to statement 15, wherein the device connects to the system using an interface drawn from a set including Peripheral Component Interconnect Express (PCIe), Ethernet, Infiniband, or Fibre Channel.

Statement 22. An embodiment of the disclosure includes the system according to statement 15, wherein the device communicates with the system using a protocol drawn from the set including Non-Volatile Memory Express (NVMe), NVMe over Fabrics (NVMe-oF), or Simple Service Discovery Protocol (SSDP).

Statement 23. An embodiment of the disclosure includes the system according to statement 15, wherein the transmitter is configured to forward the information about the device to a discovery service.

Statement 24. An embodiment of the disclosure includes the system according to statement 15, wherein the computational storage unit includes a storage device.

Statement 25. An embodiment of the disclosure includes the system according to statement 24, wherein the storage device includes a Solid State Drive (SSD).

Statement 26. An embodiment of the disclosure includes the system according to statement 24, wherein the device further includes a second computational storage unit drawn from a set including an in-storage processor or an accelerator.

Statement 27. An embodiment of the disclosure includes the system according to statement 24, wherein the storage device is paired with a second computational storage unit.

Statement 28. An embodiment of the disclosure includes the system according to statement 15, wherein the computational storage unit is paired with a storage device.

Statement 29. An embodiment of the disclosure includes the system according to statement 15, wherein the device is local to the system.

Statement 30. An embodiment of the disclosure includes the system according to statement 15, wherein the device is remote from the system.

Statement 31. An embodiment of the disclosure includes a method, comprising:
  receiving a discovery request from a discovery service at a device, the device including a computational storage unit;
  generating a discovery response, the discovery response including information about the computational storage unit; and
  sending the discovery response from the device to the discovery service.

Statement 32. An embodiment of the disclosure includes the method according to statement 31, wherein the information about the computational storage unit includes at least one bit identifying a type of the computational storage unit.

Statement 33. An embodiment of the disclosure includes the method according to statement 31, further comprising generating a log page including supplemental information about the computational storage unit.

Statement 34. An embodiment of the disclosure includes the method according to statement 33, wherein:
  the device further includes a second computational storage unit; and
  the method further comprises generating a second log page including second supplemental information about the second computational storage unit.

Statement 35. An embodiment of the disclosure includes the method according to statement 31, wherein the computational storage unit includes a storage device.

Statement 36. An embodiment of the disclosure includes the method according to statement 35, wherein the storage device includes a Solid State Drive (SSD).

Statement 37. An embodiment of the disclosure includes the method according to statement 35, wherein the device includes a second computational storage unit drawn from a set including an in-storage processor or an accelerator.

Statement 38. An embodiment of the disclosure includes the method according to statement 35, wherein the storage device is paired with a second computational storage unit.

Statement 39. An embodiment of the disclosure includes the method according to statement 31, wherein the computational storage unit is paired with a storage device.

Statement 40. An embodiment of the disclosure includes the method according to statement 31, wherein receiving the discovery request from the discovery service at the device includes receiving the discovery request from the discovery service at the device over an interface drawn from a set including Peripheral Component Interconnect Express (PCIe), Ethernet, Infiniband, or Fibre Channel.

Statement 41. An embodiment of the disclosure includes the method according to statement 31, wherein receiving the discovery request from the discovery service at the device includes receiving the discovery request from the discovery service at the device using a protocol drawn from a set including Non-Volatile Memory Express (NVMe), NVMe over Fabrics (NVMe-oF), or Simple Service Discovery Protocol (SSDP).

Statement 42. An embodiment of the disclosure includes the method according to statement 31, wherein the device is local to a host including the discovery service.

Statement 43. An embodiment of the disclosure includes the method according to statement 31, wherein the device is remote from a host including the discovery service.

Statement 44. An embodiment of the disclosure includes a method, comprising:
  sending a discovery request to a device from a discovery service, the device including a computational storage unit; and
  receiving a discovery response from the device at the discovery service, the discovery response including information about the computational storage unit.

Statement 45. An embodiment of the disclosure includes the method according to statement 44, wherein the information about the computational storage unit includes at least one bit identifying a computational storage capability of the computational storage unit.

Statement 46. An embodiment of the disclosure includes the method according to statement 44, wherein the information about the computational storage unit includes at least one bit identifying a type of the computational storage unit.

Statement 47. An embodiment of the disclosure includes the method according to statement 44, further comprising accessing a log page including supplemental information about the computational storage unit.

Statement 48. An embodiment of the disclosure includes the method according to statement 47, wherein:
  the device includes a second computational storage unit; and
  the method further comprising accessing a second log page including second supplemental information about the second computational storage unit.

Statement 49. An embodiment of the disclosure includes the method according to statement 47, further comprising requesting the log page from the device.

Statement 50. An embodiment of the disclosure includes the method according to statement 44, wherein sending the discovery request to the device from the discovery service includes sending the discovery request to the device from the discovery service over an interface drawn from a set including Peripheral Component Interconnect Express (PCIe), Ethernet, Infiniband, or Fibre Channel.

Statement 51. An embodiment of the disclosure includes the method according to statement 44, wherein sending the discovery request to the device from the discovery service includes sending the discovery request to the device from the discovery service using a protocol drawn from a set including Non-Volatile Memory Express (NVMe), NVMe over Fabrics (NVMe-oF), or Simple Service Discovery Protocol (SSDP).

Statement 52. An embodiment of the disclosure includes the method according to statement 44, further comprising forwarding the information about the device to a discovery service.

Statement 53. An embodiment of the disclosure includes the method according to statement 44, wherein the computational storage unit includes a storage device.

Statement 54. An embodiment of the disclosure includes the method according to statement 53, wherein the storage device includes a Solid State Drive (SSD).

Statement 55. An embodiment of the disclosure includes the method according to statement 53, wherein the device further includes a second computational storage unit drawn from a set including an in-storage processor or an accelerator.

Statement 56. An embodiment of the disclosure includes the method according to statement 53, wherein the storage device is paired with a second computational storage unit.

Statement 57. An embodiment of the disclosure includes the method according to statement 44, wherein the computational storage unit is paired with a storage device.

Statement 58. An embodiment of the disclosure includes the method according to statement 44, wherein the device is local to a host including the discovery service.

Statement 59. An embodiment of the disclosure includes the method according to statement 44, wherein the device is remote from a host including the discovery service.

Statement 60. An embodiment of the disclosure includes an article, comprising a non-transitory storage medium, the non-transitory storage medium having stored thereon instructions that, when executed by a machine, result in:
  receiving a discovery request from a discovery service at a device, the device including a computational storage unit;
  generating a discovery response, the discovery response including information about the computational storage unit; and
  sending the discovery response from the device to the discovery service.

Statement 61. An embodiment of the disclosure includes the article according to statement 60, wherein the information about the computational storage unit includes at least one bit identifying a type of the computational storage unit.

Statement 62. An embodiment of the disclosure includes the article according to statement 60, the non-transitory storage medium having stored thereon further instructions that, when executed by the machine, result in generating a log page including supplemental information about the computational storage unit.

Statement 63. An embodiment of the disclosure includes the article according to statement 62, wherein:
  the device further includes a second computational storage unit; and
  the non-transitory storage medium has stored thereon further instructions that, when executed by the machine, result in generating a second log page including second supplemental information about the second computational storage unit.

Statement 64. An embodiment of the disclosure includes the article according to statement 60, wherein the computational storage unit includes a storage device.

Statement 65. An embodiment of the disclosure includes the article according to statement 64, wherein the storage device includes a Solid State Drive (SSD).

Statement 66. An embodiment of the disclosure includes the article according to statement 64, wherein the device includes a second computational storage unit drawn from a set including an in-storage processor or an accelerator.

Statement 67. An embodiment of the disclosure includes the article according to statement 64, wherein the storage device is paired with a second computational storage unit.

Statement 68. An embodiment of the disclosure includes the article according to statement 60, wherein the computational storage unit is paired with a storage device.

Statement 69. An embodiment of the disclosure includes the article according to statement 60, wherein receiving the discovery request from the discovery service at the device includes receiving the discovery request from the discovery service at the device over an interface drawn from a set including Peripheral Component Interconnect Express (PCIe), Ethernet, Infiniband, or Fibre Channel.

Statement 70. An embodiment of the disclosure includes the article according to statement 60, wherein receiving the discovery request from the discovery service at the device includes receiving the discovery request from the discovery service at the device using a protocol drawn from a set including Non-Volatile Memory Express (NVMe), NVMe over Fabrics (NVMe-oF), or Simple Service Discovery Protocol (SSDP).

Statement 71. An embodiment of the disclosure includes the article according to statement 60, wherein the device is local to a host including the discovery service.

Statement 72. An embodiment of the disclosure includes the article according to statement 60, wherein the device is remote from a host including the discovery service.

Statement 73. An embodiment of the disclosure includes an article, comprising a non-transitory storage medium, the non-transitory storage medium having stored thereon instructions that, when executed by a machine, result in:
  sending a discovery request to a device from a discovery service, the device including a computational storage unit; and
  receiving a discovery response from the device at the discovery service, the discovery response including information about the computational storage unit.

Statement 74. An embodiment of the disclosure includes the article according to statement 73, wherein the information about the computational storage unit includes at least one bit identifying a computational storage capability of the computational storage unit.

Statement 75. An embodiment of the disclosure includes the article according to statement 73, wherein the information about the computational storage unit includes at least one bit identifying a type of the computational storage unit.

Statement 76. An embodiment of the disclosure includes the article according to statement 73, the non-transitory storage medium having stored thereon further instructions that, when executed by the machine, result in accessing a log page including supplemental information about the computational storage unit.

Statement 77. An embodiment of the disclosure includes the article according to statement 76, wherein:
  the device includes a second computational storage unit; and
  the non-transitory storage medium has stored thereon further instructions that, when executed by the machine, result in accessing a second log page including second supplemental information about the second computational storage unit.

Statement 78. An embodiment of the disclosure includes the article according to statement 76, the non-transitory storage medium having stored thereon further instructions that, when executed by the machine, result in requesting the log page from the device.

Statement 79. An embodiment of the disclosure includes the article according to statement 73, wherein sending the discovery request to the device from the discovery service includes sending the discovery request to the device from the discovery service over an interface drawn from a set including Peripheral Component Interconnect Express (PCIe), Ethernet, Infiniband, or Fibre Channel.

Statement 80. An embodiment of the disclosure includes the article according to statement 73, wherein sending the discovery request to the device from the discovery service includes sending the discovery request to the device from the discovery service using a protocol drawn from a set including Non-Volatile Memory Express (NVMe), NVMe over Fabrics (NVMe-oF), or Simple Service Discovery Protocol (SSDP).

Statement 81. An embodiment of the disclosure includes the article according to statement 73, the non-transitory storage medium having stored thereon further instructions that, when executed by the machine, result in forwarding the information about the device to a discovery service.

Statement 82. An embodiment of the disclosure includes the article according to statement 73, wherein the computational storage unit includes a storage device.

Statement 83. An embodiment of the disclosure includes the article according to statement 82, wherein the storage device includes a Solid State Drive (SSD).

Statement 84. An embodiment of the disclosure includes the article according to statement 82, wherein the device further includes a second computational storage unit drawn from a set including an in-storage processor or an accelerator.

Statement 85. An embodiment of the disclosure includes the article according to statement 82, wherein the storage device is paired with a second computational storage unit.

Statement 86. An embodiment of the disclosure includes the article according to statement 73, wherein the computational storage unit is paired with a storage device.

Statement 87. An embodiment of the disclosure includes the article according to statement 73, wherein the device is local to a host including the discovery service.

Statement 88. An embodiment of the disclosure includes the article according to statement 73, wherein the device is remote from a host including the discovery service.

Statement 89. An embodiment of the disclosure includes a memory, comprising:
  a data structure stored in the memory, the data structure including:
  a first identifier of a device, the device including a computational storage unit; and
  a second identifier of a capability of the computational storage unit.

Statement 90. An embodiment of the disclosure includes the memory according to statement 89, wherein the data structure further includes a third identifier of a type of the computational storage unit.

Statement 91. An embodiment of the disclosure includes the memory according to statement 89, wherein the data structure further includes a third identifier of a host including the device.

Statement 92. An embodiment of the disclosure includes the memory according to statement 89, wherein the memory is configured to return the first identifier of the device in response to a query from an application.

Statement 93. An embodiment of the disclosure includes the memory according to statement 92, wherein the memory is further configured to return the second identifier of the capability of the computational storage unit to the application.

Statement 94. An embodiment of the disclosure includes the memory according to statement 89, wherein the data structure further includes a supplemental information about the computational storage unit.

Statement 95. An embodiment of the disclosure includes the memory according to statement 89, wherein the data structure further includes a third identifier that the device is paired with a second computational storage unit.

Statement 96. An embodiment of the disclosure includes a method, comprising:
- receiving information about a computational storage unit of a device at a discovery service;
- storing the information about the computational storage unit of the device in a data structure;
- receiving a request from an application for the information about the computational storage unit of the device; and
- returning to the application the information about the computational storage unit of the device.

Statement 97. An embodiment of the disclosure includes the method according to statement 96, wherein receiving the information about the computational storage unit of the device at the discovery service includes receiving supplemental information about the computational storage unit of the device at the discovery service.

Statement 98. An embodiment of the disclosure includes the method according to statement 96, wherein the information about the computational storage unit of the device includes at least one of an identifier of a computational storage capability of the computational storage unit, a type of the computational storage unit, and supplemental information about the computational storage unit.

Statement 99. An embodiment of the disclosure includes a method, comprising:
- identifying a computational storage unit to be used by an application;
- sending a discovery request from the application;
- receiving a discovery response at the application, the discovery response identifying a device including the computational storage unit; and
- sending a command from the application to the device.

Statement 100. An embodiment of the disclosure includes the method according to statement 99, wherein identifying the computational storage unit to be used by the application includes identifying a type of the computational storage unit to be used by the application.

Statement 101. An embodiment of the disclosure includes the method according to statement 99, wherein identifying the computational storage unit to be used by the application includes identifying a computational storage capability of the computational storage unit to be used by the application.

Statement 102. An embodiment of the disclosure includes the method according to statement 99, wherein:
- sending the discovery request from the application includes sending the discovery request from the application to a discovery service; and
- receiving the discovery response at the application includes receiving the discovery response at the application from the discovery service.

Statement 103. An embodiment of the disclosure includes the method according to statement 99, wherein:
- sending the discovery request from the application includes sending the discovery request from the application to the device; and
- receiving the discovery response at the application includes receiving the discovery response at the application from the device.

Statement 104. An embodiment of the disclosure includes an article, comprising a non-transitory storage medium, the non-transitory storage medium having stored thereon instructions that, when executed by a machine, result in:
- receiving information about a computational storage unit of a device at a discovery service;
- storing the information about the computational storage unit of the device in a data structure;
- receiving a request from an application for the information about the computational storage unit of the device; and
- returning to the application the information about the computational storage unit of the device.

Statement 105. An embodiment of the disclosure includes the article according to statement 104, wherein receiving the information about the computational storage unit of the device at the discovery service includes receiving supplemental information about the computational storage unit of the device at the discovery service.

Statement 106. An embodiment of the disclosure includes the article according to statement 104, wherein the information about the computational storage unit of the device includes at least one of an identifier of a computational storage capability of the computational storage unit, a type of the computational storage unit, and supplemental information about the computational storage unit.

Statement 107. An embodiment of the disclosure includes an article, comprising a non-transitory storage medium, the non-transitory storage medium having stored thereon instructions that, when executed by a machine, result in:
- identifying a computational storage unit to be used by an application;
- sending a discovery request from the application;
- receiving a discovery response at the application, the discovery response identifying a device including the computational storage unit; and
- sending a command from the application to the device.

Statement 108. An embodiment of the disclosure includes the article according to statement 107, wherein identifying the computational storage unit to be used by the application includes identifying a type of the computational storage unit to be used by the application.

Statement 109. An embodiment of the disclosure includes the article according to statement 107, wherein identifying the computational storage unit to be used by the application includes identifying a computational storage capability of the computational storage unit to be used by the application.

Statement 110. An embodiment of the disclosure includes the article according to statement 107, wherein:
- sending the discovery request from the application includes sending the discovery request from the application to a discovery service; and
- receiving the discovery response at the application includes receiving the discovery response at the application from the discovery service.

Statement 111. An embodiment of the disclosure includes the article according to statement 107, wherein:
- sending the discovery request from the application includes sending the discovery request from the application to the device; and receiving the discovery response at the application includes receiving the discovery response at the application from the device.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A device, comprising:
a physical connector that provides a physical connection between the device and a host;
a storage device;
a computational storage unit, the computational storage unit including a processor providing near-storage processing of data associated with the storage device via a service of the processor;
a receiver to receive, from the host via the physical connection, a request for computational storage capabilities of the computational storage unit; and
a transmitter to send a response to the host via the physical connection, the response including information about the service offered by the processor of the computational storage unit, wherein the information indicates a type of processor included in the computational storage unit.

2. The device according to claim 1, wherein the information about the computational storage unit includes at least one bit identifying a computational storage capability of the computational storage unit.

3. The device according to claim 1, further comprising a log page unit to generate a log page, the log page including supplemental information about the computational storage unit.

4. The device according to claim 3, wherein:
the device further comprises a second computational storage unit; and
the log page unit is configured to generate a second log page including second supplemental information about the second computational storage unit.

5. The device according to claim 1, wherein the computational storage unit includes the storage device.

6. The device according to claim 1, wherein the computational storage unit is paired with the storage device.

7. A system, comprising:
a device including:
a storage device; and
a computational storage unit, the computational storage unit including a processor providing near-storage processing of data associated with the storage device via a service of the processor; and
a host, including:
a transmitter to send, to the device via a physical connection between the host and the device, a request for computational storage capabilities of the computational storage unit; and
a receiver to receive, from the device via the physical connection to the device, a response, the response including information about the service offered by the processor of the computational storage unit, wherein the information indicates a type of processor included in the computational storage unit.

8. The system according to claim 7, wherein the information about the computational storage unit includes at least one bit identifying a computational storage capability of the computational storage unit.

9. The system according to claim 7, wherein the host is configured to access a log page including supplemental information about the computational storage unit.

10. The system according to claim 9, wherein the transmitter is configured to send a log page request to the device.

11. The system according to claim 7, wherein the transmitter is configured to forward the information about the device to a discovery service.

12. A method, comprising:
receiving, at a device from a host via a physical connection between the device and the host, a request for computational storage capabilities of a computational storage unit of the device, the device including:
a storage device; and
the computational storage unit, the computational storage unit including a processor providing near-storage processing of data associated with the storage device via a service of the processor;
generating a response, the response including information about the service offered by the processor of the computational storage unit, wherein the information indicates a type of processor included in the computational storage unit; and
sending, to the host via the physical connection to the host, the response from the device.

13. The method according to claim 12, further comprising generating a log page including supplemental information about the computational storage unit.

14. The method according to claim 13, wherein:
the device further includes a second computational storage unit; and
the method further comprises generating a second log page including second supplemental information about the second computational storage unit.

15. The method according to claim 12, wherein the computational storage unit includes the storage device.

16. The method according to claim 15, wherein the storage device is paired with a second computational storage unit.

17. The method according to claim 12, wherein the computational storage unit is paired with the storage device.

* * * * *